(12) United States Patent
Zhou et al.

(10) Patent No.: US 12,452,579 B2
(45) Date of Patent: Oct. 21, 2025

(54) VIBRATION SENSING DEVICES

(71) Applicant: SHENZHEN SHOKZ CO., LTD., Guangdong (CN)

(72) Inventors: Wenbing Zhou, Shenzhen (CN); Wenjun Deng, Shenzhen (CN); Yongshuai Yuan, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 325 days.

(21) Appl. No.: 18/329,597

(22) Filed: Jun. 6, 2023

(65) Prior Publication Data

US 2023/0319458 A1    Oct. 5, 2023

Related U.S. Application Data

(63) Continuation of application No. PCT/CN2021/112065, filed on Aug. 11, 2021.

(30) Foreign Application Priority Data

Apr. 23, 2021    (CN) .......................... 202110445739.3

(51) Int. Cl.
*H04R 1/28* (2006.01)
*G01H 11/08* (2006.01)
(Continued)

(52) U.S. Cl.
CPC ............. *H04R 1/222* (2013.01); *G01H 11/08* (2013.01); *G01N 29/036* (2013.01);
(Continued)

(58) Field of Classification Search
CPC .......... H04R 17/02; H04R 1/44; H04R 17/00; H04R 17/10; H04R 17/025; H04R 1/222; H04R 1/28; H04R 1/2807; H04R 1/2869
See application file for complete search history.

(56) References Cited

U.S. PATENT DOCUMENTS 3,130,275 A  *  4/1964  Hagey ................... H04R 17/02
                                                         381/166
3,239,696 A  *  3/1966  Burkhalter ............. A61B 5/022
                                                          310/331
(Continued)

FOREIGN PATENT DOCUMENTS

CN    104581592 A       4/2015
CN    108833023 A  * 11/2018 ............. H04B 13/02
(Continued)

OTHER PUBLICATIONS

International Search Report in PCT/CN2021/112065 mailed on Jan. 19, 2022, 8 pages.
(Continued)

*Primary Examiner* — Ryan Robinson
(74) *Attorney, Agent, or Firm* — METIS IP LLC

(57) ABSTRACT

An embodiment of the present disclosure provides a vibration sensing device, which may include a vibration sensor and at least one vibration component. The vibration sensor has a first resonant frequency, at least one vibration component may be configured to transmit the received vibration to the vibration sensor, and the at least one vibration component may include a liquid arranged in the target cavity and a plate body forming a part of the cavity wall of the target cavity. The at least one vibration component may provide at least one second resonant frequency for the vibration sensing device, and at least one second resonant frequency may be different from the first resonant frequency.

20 Claims, 24 Drawing Sheets

(51) Int. Cl.

| | |
|---|---|
| *G01N 29/036* | (2006.01) |
| *G01N 29/24* | (2006.01) |
| *G01P 1/02* | (2006.01) |
| *H04R 1/08* | (2006.01) |
| *H04R 1/20* | (2006.01) |
| *H04R 1/22* | (2006.01) |
| *H04R 17/02* | (2006.01) |
| *H04R 17/10* | (2006.01) |
| *H04R 19/04* | (2006.01) |

(52) U.S. Cl.
CPC ..... *G01N 29/2406* (2013.01); *G01N 29/2437* (2013.01); *G01P 1/023* (2013.01); *H04R 1/08* (2013.01); *H04R 1/20* (2013.01); *H04R 17/02* (2013.01); *H04R 17/10* (2013.01); *H04R 19/04* (2013.01); *G01N 2291/014* (2013.01); *G01N 2291/022* (2013.01)

(56) References Cited

U.S. PATENT DOCUMENTS

| | | | |
|---|---|---|---|
| 4,561,447 A * | 12/1985 | Kawamura | A61B 5/021 |
| | | | 600/500 |
| 4,596,903 A * | 6/1986 | Yoshizawa | H04R 1/46 |
| | | | 381/151 |
| 5,325,718 A | 7/1994 | Ono | |
| 5,533,381 A | 7/1996 | Seale | |
| 6,295,365 B1 * | 9/2001 | Ota | H04R 17/00 |
| | | | 381/67 |
| 6,463,157 B1 * | 10/2002 | May | H04R 1/083 |
| | | | 381/151 |
| 9,591,413 B2 * | 3/2017 | Miller | H04R 25/60 |
| 11,058,394 B2 * | 7/2021 | Falkner | A61B 7/02 |
| 2009/0085442 A1 | 4/2009 | Kozinsky et al. | |
| 2010/0186487 A1 | 7/2010 | Sakashita | |
| 2011/0235841 A1 | 9/2011 | Tanaka et al. | |
| 2013/0047746 A1 | 2/2013 | Nakamura et al. | |
| 2015/0362393 A1 | 12/2015 | Soccol et al. | |
| 2017/0156002 A1 | 6/2017 | Han et al. | |
| 2019/0331543 A1 | 10/2019 | Cavalloni et al. | |
| 2021/0009046 A1 | 1/2021 | Kamiya et al. | |

FOREIGN PATENT DOCUMENTS

| | | |
|---|---|---|
| CN | 210065158 U | 2/2020 |
| CN | 111510834 A | 8/2020 |
| CN | 212748031 U | 3/2021 |
| WO | 2005024367 A2 | 3/2005 |

OTHER PUBLICATIONS

Written Opinion in PCT/CN2021/112065 mailed on Jan. 19, 2022, 6 pages.

* cited by examiner

VIBRATION SENSING DEVICES

CROSS-REFERENCE TO RELATED APPLICATIONS

This application is a Continuation of International Application No. PCT/CN2021/112065 filed on Aug. 11, 2021, which claims priority to Chinese application No. 202110445739.3, filed on Apr. 23, 2021, the entire contents of which are incorporated herein by reference.

TECHNICAL FIELD

The present disclosure relates to the field of sensing devices, in particular to vibration sensing devices.

BACKGROUND

A vibration sensing device (e.g., a microphone) receives external vibration signal. Near a resonant frequency of the vibration sensing device, the vibration signal may produce a large amplitude due to resonant effects. Correspondingly, the response of the vibration sensing device to the external vibration signal may be shown as that its corresponding frequency response curve produces a resonant peak near the resonant frequency. The sensitivity of the vibration sensing device to induce vibration is high near the resonant frequency, while the sensitivity is low at other frequencies (e.g., 2-5K Hz), resulting in unstable frequency response of the vibration sensing device in different frequency ranges.

Therefore, it is desirable to provide a vibration sensing device, which may improve the sensitivity of the device to sense vibration, and at the same time have a relatively stable frequency response in a wide frequency range.

SUMMARY

The present disclosure provides a vibration sensing device. The vibration sensing device may include a vibration sensor and at least one vibration component. The vibration sensor has a first resonant frequency. At least one vibration component may be configured to transmit received vibrations to the vibration sensor. The at least one vibration component may include a liquid arranged in the target cavity and a plate body forming a part of a cavity wall of the target cavity. The at least one vibration component may provide at least one second resonant frequency for the vibration sensing device, and the at least one second resonant frequency may be different from the first resonant frequency.

In some embodiments, the at least one vibration component may be configured to form one or more resonant systems, and one of the one or more resonant systems may be composed of the liquid and the plate body.

In some embodiments, the first resonant frequency may be related to structural parameters of the vibration sensor, and the at least one second resonant frequency may be related to structural parameters of the at least one vibration component.

In some embodiments, each of the at least one second resonant frequency may be lower than the first resonant frequency.

In some embodiments, a difference between a peak and a trough of a frequency response curve of the vibration sensing device may be in the range of 5 dBV to 15 dBV.

In some embodiments, the vibration sensing device may further comprise an adjusting element, which may be arranged in the target cavity or configured to form a part of the cavity wall of the target cavity, and the adjusting element may be configured to define the size of the target cavity.

In some embodiments, the target cavity may include a first sub-cavity and a second sub-cavity, the first sub-cavity may be configured to contain the liquid, and the second sub-cavity may be configured to contain one or more fillers of gas, liquid, or solid.

In some embodiments, the vibration sensor may include a bone conduction vibration sensor, and the bone conduction vibration sensor may include a housing, an acoustic-electric conversion element, and a vibration transmission element. The housing may generate vibrations in response to external vibration signals, and the vibration transmission element may transmit the vibrations to the acoustic-electric conversion element. The at least one vibration component may be configured to receive the vibration of at least one of the housing or the vibration transmission element and transmit the vibrations to the acoustic-electric conversion element. The acoustic-electric conversion element may have different frequency responses to the vibrations transmitted by the vibration transmission element and the vibration transmitted by at least one vibration component.

In some embodiments, the plate body may include a first plate body and a second plate, the first plate body and the second plate body may divide the space in the housing into a plurality of cavities, and the plurality of cavities may include a first cavity defined by the first plate, the second plate body and the vibration transmission element, a second cavity defined by the first plate body and a part of the housing, and a third cavity defined by the second plate body and a part of the housing, the target cavity may include one or more of the plurality of cavities.

In some embodiments, the target cavity may include the first cavity.

In some embodiments, the acoustic-electric conversion element may be disposed in the first cavity.

In some embodiments, the second cavity and/or the third cavity may contain gas, and the at least one vibration component may further include a gas contained in the second cavity or/and the third cavity.

In some embodiments, the at least one vibration component may further include a vibration pickup element, which may be arranged between the housing and the vibration transmission element, and the vibration pickup element is configured to vibrate in response to vibrations of the housing.

In some embodiments, the one or more resonant systems may include a first resonant system and a second resonant system. The first resonant system may be composed of the liquid and the plate body. The second resonant system may be composed of the vibration pickup element, the vibration transmission element, the acoustic-electric conversion element, the liquid, and the plate body.

In some embodiments, the second resonant system and the first resonant system may provide at least two different second resonant frequencies for the vibration sensing device.

In some embodiments, the target cavity may include at least one of the second cavity or the third cavity.

In some embodiments, the vibration sensing device may further include a support element which may be arranged in the first cavity and physically connected to the first plate body and the second plate, the support element may be configured to support the first plate body and the second plate.

In some embodiments, the at least one vibration component may further include a vibration pickup element, which may be arranged between the housing and the vibration transmission element.

In some embodiments, the first plate body and the second plate body may include a rigid plate, and the one or more resonant systems may include the vibration transmission element, the acoustic-electric conversion element, the A resonant system formed by the liquid, the plate body and the vibration pickup element.

In some embodiments, the first plate body and the second plate body may include a flexible plate, the one or more resonant systems may include a first resonant system and a second resonant system, the first resonant system may be composed of the vibration transmission element, the acoustic electrical conversion element, the liquid, the plate body and the vibration pickup element, and the second resonant system may be composed of the first plate body, the acoustic-electric conversion element and the second plate body.

In some embodiments, the vibration sensing device may further include a support element, the acoustic-electric conversion element may be arranged in the first cavity and divided into a first gas cavity and a second gas cavity, a first end of the acoustic-electric conversion element may be connected to the support element, and a second end of the acoustic-electric conversion element may be connected to the vibration transmission element. The first plate body and/or the second plate body may receive the vibration of the liquid and/or the vibration pickup element, and transmit the vibration to the acoustic-electric conversion element through the first gas cavity and/or the second gas cavity to form the second resonant system.

In some embodiments, the vibration sensor may include an air conduction vibration sensor, and the air conduction vibration sensor may include an acoustic-electric conversion element and a sound inlet hole.

In some embodiments, the vibration sensing device may include a housing physically connected to the at least one vibration component, and the housing and a portion of the vibration sensor may form a holding space for accommodating the at least one vibration component. The housing may be configured to generate vibrations in response to an external vibration signal. The at least one vibration component may be acoustically connected to the acoustic-electric conversion element through the sound inlet hole, and is configured to receive the vibrations generated by the housing and transmit the vibration to the acoustic-electric conversion element through the sound inlet hole.

In some embodiments, at least part of the plate body may be physically connected to the housing, and the target cavity may include a cavity defined by the plate body and at least part of the housing.

In some embodiments, the plate body may be arranged in the sound inlet hole and physically connected to the vibration sensor. The target cavity may include a cavity defined by the plate, the housing and at least part of the vibration sensor.

In some embodiments, the plate body may include a first plate body and a second plate, the first plate body and the second plate body may be physically connected to the housing, and the target cavity may include a cavity defined by at least the first plate, the second plate, and at least a portion of the housing.

In some embodiments, the plate body may include a first plate body and a second plate, the first plate body may be physically connected to the housing, the second plate body may be arranged in the sound inlet hole to be physically connected to the vibration sensor, and the target cavity may include at least a cavity defined by the first plate, the second plate, the vibration sensor, and at least a part of the housing.

Additional features will be partially described in the following description, and will become apparent to those skilled in the art by referring to the following content and drawings, or may be understood by the generation or operation of examples. The features of the invention may be realized and obtained by practicing or using various aspects of the methods, means and combinations set forth in the following detailed examples.

BRIEF DESCRIPTION OF THE DRAWINGS

The present application will be further illustrated by means of exemplary embodiments, which will be described in detail by means of the accompanying drawings. These examples are non-limiting, and in these examples, the same number indicates the same structure, wherein.

DETAILED DESCRIPTION

Figure 1:
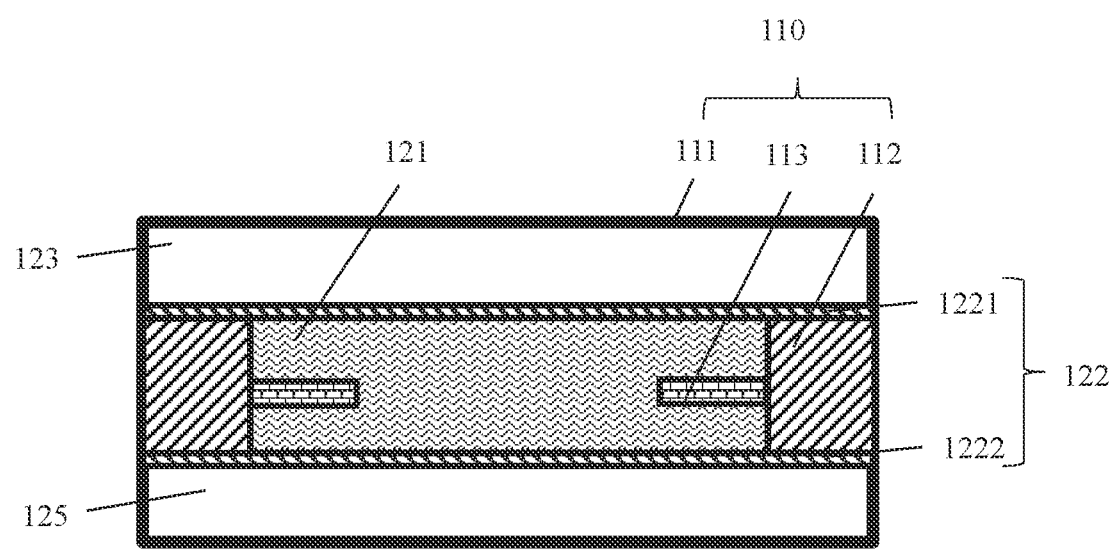
FIG. 1 is a cross-sectional view of an exemplary vibration sensing device according to some embodiments of the present disclosure.

The technical solution of the present disclosure embodiment is more clearly described below, and the accompanying drawings need to be used in the description of the embodiments will be briefly described below. It will be apparent that the drawings in the following description are merely some examples or embodiments of the present disclosure, and those of ordinary skill in the art will apply the disclosure to other similar scenes according to the drawings without the premise of creative labor. Unless obviously obtained from the context or the context illustrates otherwise, the same numeral in the drawings refers to the same structure or operation.

It will be understood that the term "system," "engine," "unit," "module," and/or "block" used herein are one method to distinguish different assemblies, elements, parts, sections or assemblies of different levels in ascending order. However, the terms may be displaced by other expressions if they achieve the same purpose.

A variety of terms are used to describe the spatial and functional relationships between elements (e.g., between components), including "connect," "join," "interface", and "couple". Unless explicitly described as "direct," when describing the relationship between the first and second elements in this application, the relationship includes the direct relationship between the first and second elements without other intermediate elements, and the indirect relationship between the first and second elements with one or more intermediate elements (spatially or functionally). In contrast, when an element is called to be "directly" connected, bonded, interfaced, or coupled to another element, there is no intermediate element. In addition, the spatial and functional relationships between elements may be achieved in various ways. For example, a mechanical connection between two components may include a welded connection, a key connection, a pin connection, an interference fit connection, or any combination thereof. Other words used to describe the relationship between elements should be interpreted in a similar way (e.g., "between," "adjacent," and "directly adjacent").

It should be understood that the terms "first," "second," "third" etc., used herein may be used to describe various elements. These are only used to distinguish one element from another and are not intended to limit the scope of the elements. For example, the first element may also be called the second element, similarly, the second element may also be called the first element.

As used herein, the singular forms "a," "an," and "the" may be intended to include the plural forms as well, unless the context clearly indicates otherwise. It will be further understood that the terms "comprise," and/or "include," when used in the present disclosure, specify the presence of stated features, operations, and elements, but do not preclude the presence or addition of one or more other operations and elements in the method or device. The term "based on" is "based at least part on". The term "one embodiment" means "at least one embodiment". The term "another embodiment" means "at least one further embodiment". Related definitions of other terms will be given in the description below. Hereinafter, without loss of generality, when describing vibration-related technologies in the present disclosure, the description of "sensing device" and "sensor" will be used. This description is only a form of conduction application. For those of ordinary skill in the art, "sensing device," or "sensor" may also be replaced by other similar words, such as "microphone," "microphone," "hydrophone,"", "transducer," "acousto-optic modulator," "acoustic-electric conversion device," "accelerometer" etc., For those skilled in the art, after understanding the basic principle of the loudspeaker device, it is possible to make various modifications and changes in the form and details of the specific method and steps for implementing the microphone without departing from this principle. However, these amendments and changes are still within the protection scope of the present disclosure.

An embodiment of the present application provides a vibration sensing device. The vibration sensing device may generate changes of parameters (e.g., a deformation, a displacement, a change of voltage, etc.) according to a vibration signal, so as to convert the vibration signal into an electrical signal. The vibration signal may include a sound signal, a mechanical signal (e.g., mechanical vibrations), an electrical signal, an optical signal, a thermal signal, etc., The vibration sensing device provided in the present disclosure may be applied to various scenes that requires vibration signal pickups and/or detection. For example, the vibration sensing device may be used in a microphone (e.g., a bone conduction microphone, an air conduction microphone, or a combination thereof) that converts sound and vibration signals into the electrical signals for transmission. As another example, the vibration sensing device may be used on an accelerometer that converts the vibration signal emitted by the measured object into an electrical signal, thereby performing acceleration analysis. For another example, the vibration sensing device may also be applied to vibration sensing devices such as pressure sensing devices, hydrophones, energy harvesters, and gyroscopes.

In some embodiments, the vibration sensing device may include a vibration sensor and at least one vibration component. The at least one vibration component may transmit the received vibrations to the vibration sensor, and the vibration sensor may convert the vibration signal into an electrical signal, so that other devices (e.g., a sampling device, a signal processing device, etc.) may process the electrical signal. In some embodiments, the vibration sensor has a first resonant frequency related to the structural parameters (e.g., a shape, a material, a structure, etc.) of the vibration sensor. In some embodiments, the at least one vibration component may be configured to form one or more resonant systems, one of the one or more resonant systems may comprise a liquid arranged in a target cavity and a plate body forming a part of a cavity wall of the target cavity. The one or more resonant systems may have at least one second resonant frequency. In some embodiments, the at least one second resonant frequency may be the same or different from the first resonant frequency. By adjusting one or more parameters of the vibration sensor and/or the at least one vibration component, the first resonant frequency and the second resonant frequency may be adjusted, so that the sensitivity of the vibration sensing device in different frequency ranges may be adjusted, and the output stability of the vibration sensing device in a certain frequency range may be improved. In addition, the liquid in the target cavity may also improve an anti-collision performance of the vibration sensing device and improve a reliability of the vibration sensing device.

FIG. 1 is a cross-sectional view of an exemplary vibration sensing device according to some embodiments of the present disclosure. As shown in FIG. 1, the vibration sensing device 100 may include a vibration sensor 110 and at least one vibration component.

The vibration sensor 110 may be an energy conversion device that converts a vibration signal into an electrical signal. The vibration sensor 110 may include a bone conduction vibration sensor, an air conduction vibration sensor, or a combination of the bone conduction vibration sensor and the air conduction vibration sensor according to the way of vibration transmission. The air conduction vibration sensor refers to a sensor that transmits vibration by means of gas (e.g., air) conduction. The bone conduction vibration sensor refers to a sensor that transmits vibration through solid (e.g., bone, skin) conduction. For the convenience of description, the bone conduction vibration sensor is taken as an example for illustration in FIGS. 1 to 14. FIGS. 15 to 22 take the air conduction vibration sensor as an example for illustration.

As shown in FIG. 1, the vibration sensor 110 may include a housing 111, a vibration transmission element 112, and an acoustic-electric conversion element 113. The at least one vibration component may include a liquid and a plate body 122.

In some embodiments, the housing 111 is configured as a hollow structure, which may be configured to accommodate other elements of the vibration sensing device 100 (e.g., the vibration component, the vibration transmission element 112, the acoustic-electric conversion element 113, etc.). The shape and/or material of the housing 111 may be set according to actual conditions. The shape of the housing 111 may include regular structures such as a cuboid, a cylinder, a frustum, or other irregular structures. The materials of the housing 111 may include, but are not limited to, one or more of metals, alloy materials, polymer materials (e.g., acrylonitrile butadiene styrene copolymer, PVC, polycarbonate, polypropylene, etc.), etc., The housing 111 may be configured to generate vibrations in response to an external vibration signal. For example, the housing 111 may receive vibration signals transmitted by the skull of a human body. The vibration signal may be transmitted through the housing 111 to the vibration transmission element 112 and/or the vibration components (e.g., the plate body 122).

The vibration transmission element 112 may be configured to transmit the vibration signal. For example, the vibration transmission element 112 may transmit the vibration signal generated by the housing 111 to the acoustic-electric conversion element 113. In some embodiments, the materials of the vibration transmission element 112 may include, but are not limited to, one or more of semiconductor materials (e.g., silicon, silicon dioxide, silicon carbide, silicon nitride, etc., or a combination thereof), metal materials, metal alloys, organic materials, etc., In some embodiments, the vibration transmission element 112 may be physically connected to the plate body 122, the housing 111, at least a part of the acoustic-electric conversion element 113, or a combination thereof. For example, as shown in FIG. 1, the vibration transmission element 112 may be arranged in a space formed by at least a portion of the plate body 122 and the housing 111. In some embodiments, the vibration transmission element 112 and the plate body 122 may define or form the first cavity 121.

The acoustic-electric conversion element 113 may be configured to convert the received vibration signal into an electrical signal. In some embodiments, the acoustic-electric conversion element 113 may be disposed in the first cavity 121, as shown in FIG. 1. Specifically, one end of the acoustic-electric conversion element 113 may be connected to the side wall of the vibration transmission element 112, and the other end of the acoustic-electric conversion element 113 may be suspended in the first cavity 121. In some embodiments, the acoustic-electric conversion element 113 may include a capacitive acoustic-electric conversion element, a piezoelectric acoustic-electric conversion element, or a combination thereof. In some embodiments, the vibration signal delivered to the acoustic-electric conversion element 113 may cause a change in one or more parameters of the acoustic-electric conversion element 113 (e.g., a capacitance, a charge, an acceleration, a light intensity, a frequency response, etc., or a combination thereof), the changed parameters may be detected by electrical methods and output electrical signals corresponding to the vibration signals. For example, the piezoelectric acoustic-electric conversion element may be an element that converts the change of the measured non electric quantity (e.g., a pressure, a displacement, etc.) into the change of the voltage. For example, the piezoelectric acoustic-electric conversion element may include a cantilever beam structure (or a diaphragm structure), the cantilever beam structure may be deformed under vibrations, and the inverse piezoelectric effect caused by the deformed cantilever beam structure may generate electrical signals. For another example, the capacitive acoustic-electric conversion element may be an element that converts the change of the measured non electric quantity (e.g., a displacement, a pressure, a light intensity, an acceleration, etc.) into the change of capacitance. For example, the capacitive acoustic-electric conversion element may include a first cantilever structure and a second cantilever structure. When the first cantilever structure and the second cantilever structure receive the same vibration signal, they may produce varying degrees of deformation, so that the spacing between the first cantilever structure and the second cantilever structure changes. The first cantilever beam structure and the second cantilever beam structure may convert the change of the distance between them into the change of capacitance, so as to realize the conversion of the vibration signal into the electric signal.

In some embodiments, a count, a type, and an arrangement of the acoustic-electric conversion elements 113 may be set according to actual needs. For example, the acoustic-electric conversion element 113 may include one or more acoustic-electric conversion elements, for example, 2, 3, 5, 7 etc. In some embodiments, different acoustic-electric conversion elements 113 may have the same or different frequency responses. For example, acoustic-electric converters 113 with different frequency responses may detect the same vibration signal, and different acoustic-electric conversion elements 113 may generate electrical signals with different resonant frequencies. The electrical signals generated by one or more acoustic-electric conversion elements 113 may be transmitted to other elements (e. g., sampling elements, signal processing elements, etc.) for further processing. Further processing of the electrical signals generated by one or more acoustic-electric conversion elements 113 may include processing of one or more electrical signals or fusion (e.g., electrical series, electrical parallel, etc.) or processing of a plurality of electrical signals. In some embodiments, processing of the electrical signal may include sampling processing, gain, and/or attenuation processing, phase adjustment processing, filtering processing, or a combination thereof.

The at least one vibration component may include a liquid disposed in a target cavity (e.g., the first cavity 121) and a plate body 122 constituting a part of a cavity wall of the target cavity. The liquid may be selected to have safety performance (e.g., non-flammable and non-explosive) and stable performance (e.g., non-volatile, high-temperature deterioration, etc.). For example, the liquid may include oil (e.g., silicone oil, glycerin, castor oil, engine oil, lubricating oil, hydraulic oil (e.g., aviation hydraulic oil), etc.), water (e.g., pure water, aqueous solution of other inorganic or organic substances (e.g., brine)), oil-water emulsion, or other liquids that meet their performance requirements, or one or more combinations thereof. The plate body may be a rigid plate body or a flexible plate. The rigid plate body refers to the plate body whose Young's modulus is greater than a first modulus threshold. A flexible plate body is a plate body whose Young's modulus is less than a second modulus threshold. In some embodiments, the first modulus threshold and/or the second modulus threshold may be set according to actual needs. In some embodiments, the first modulus threshold may or may not be equal to the second modulus threshold. For example, the first modulus threshold may be greater than the second modulus threshold. As an example only, the first modulus threshold may be 20 GPa, 30 GPa, 40 GPa, 50 GPa, etc., and the second modulus threshold may be 1 MPa, 10 MPa, 1 GPa, 10 GPa, etc., In some embodiments, the rigid plate body may include semiconductor plate, metal plate, metal alloy plate, organic material plate body (e.g., polycarbonate plate, PVC plate), or other plates that may play a role of strength support. In some embodiments, the flexible plate body may include polytetrafluoroethylene (PTFE) films, polydimethylsiloxane (PDMS) films and other polymer elastic films, or composite films (e.g., plastic films such as polyethylene (PE), polypropylene (PP), polystyrene (PS), polyvinyl chloride (PVC) and polyester (PET), etc.), polyimide (PI), cellophane, silicon film, paper and/or metal Films formed by composites such as foils). In some embodiments, the rigid plate body is not affected or has little impact by the received vibration signal, the rigid plate body does not generate vibration or the generated vibration may be ignored under the action of the received vibration signal. In some embodiments, the flexible plate body is easily affected by the received vibration signal, that is to say, the flexible plate body may vibrate or deform correspondingly under the action of the received vibration signal. In some embodiments, the count and/or the type of plate body 122 in the vibration sensing device 100 may be set according to actual needs. For example, the plate body 122 may include a rigid plate body and a flexible plate. As another example, the plate body 122 may include two rigid plates. As another example, the plate body 122 may include two rigid plates.

Figure 11:
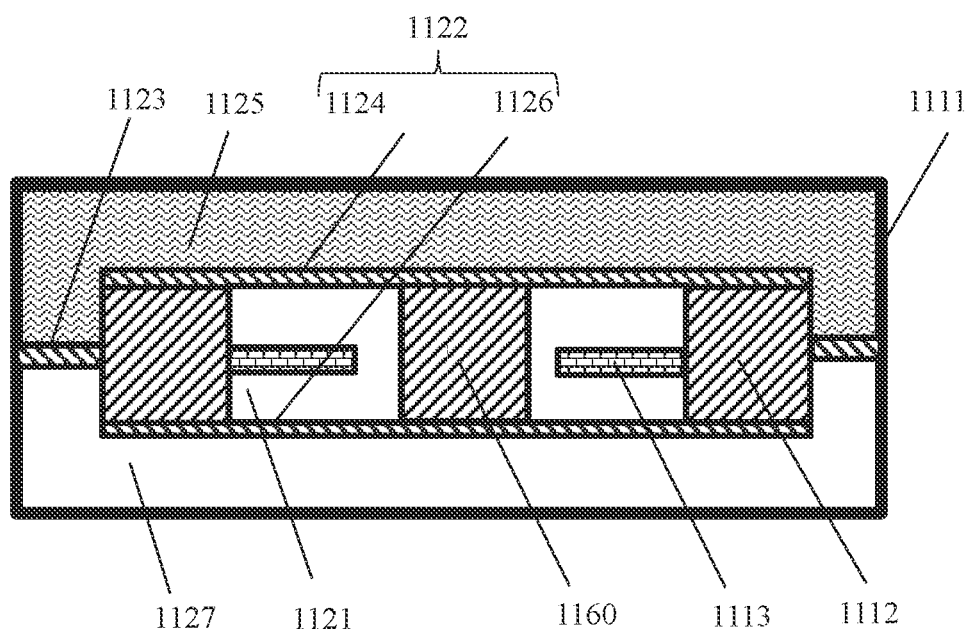
FIG. 11 is a cross-sectional view of an exemplary vibration sensing device according to some embodiments of the present disclosure.
Figure 12:
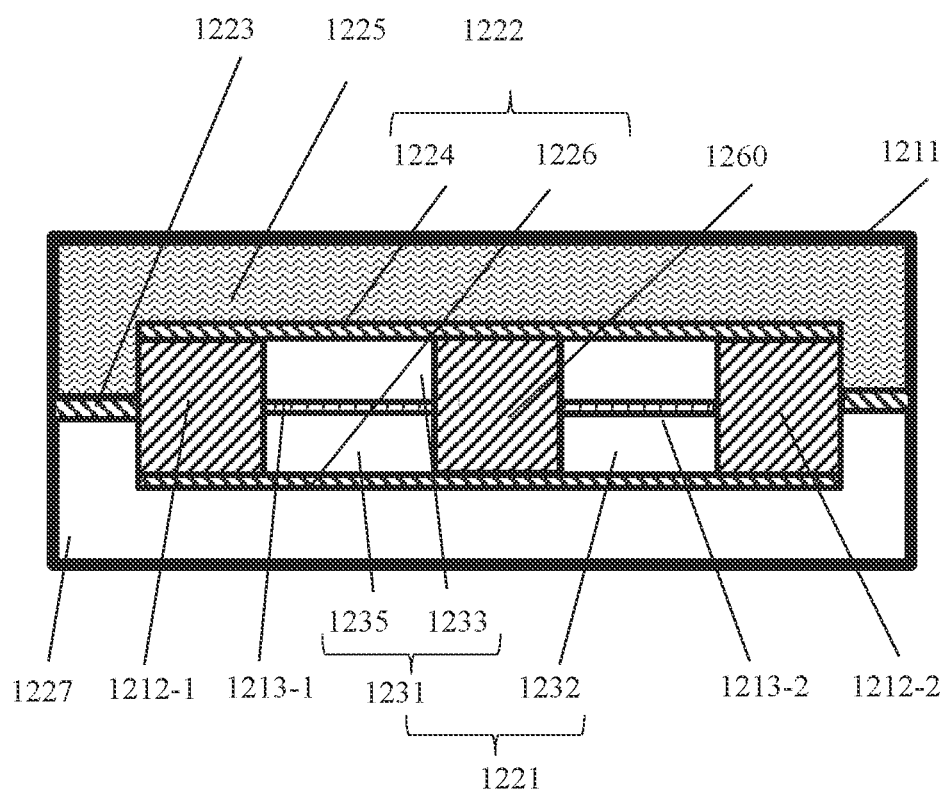
FIG. 12 is a cross-sectional view of an exemplary vibration sensing device according to some embodiments of the present disclosure.
Figure 13:
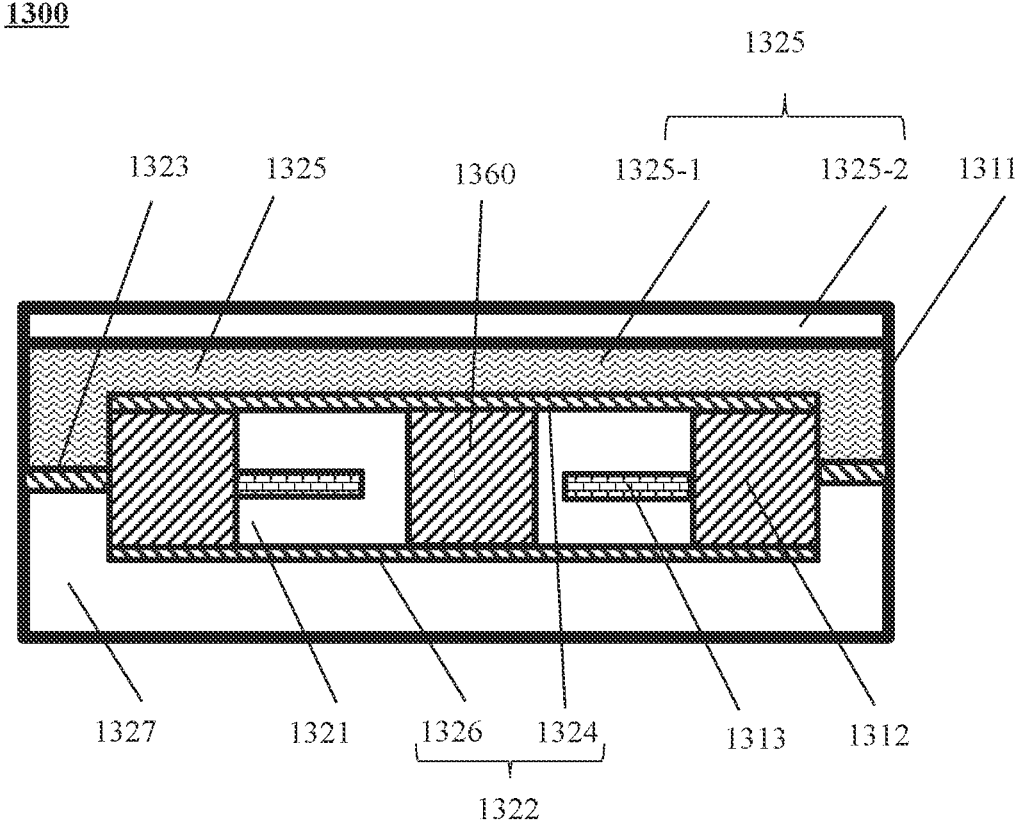
FIG. 13 is a cross-sectional view of an exemplary vibration sensing device according to some embodiments of the present disclosure.
Figure 14:
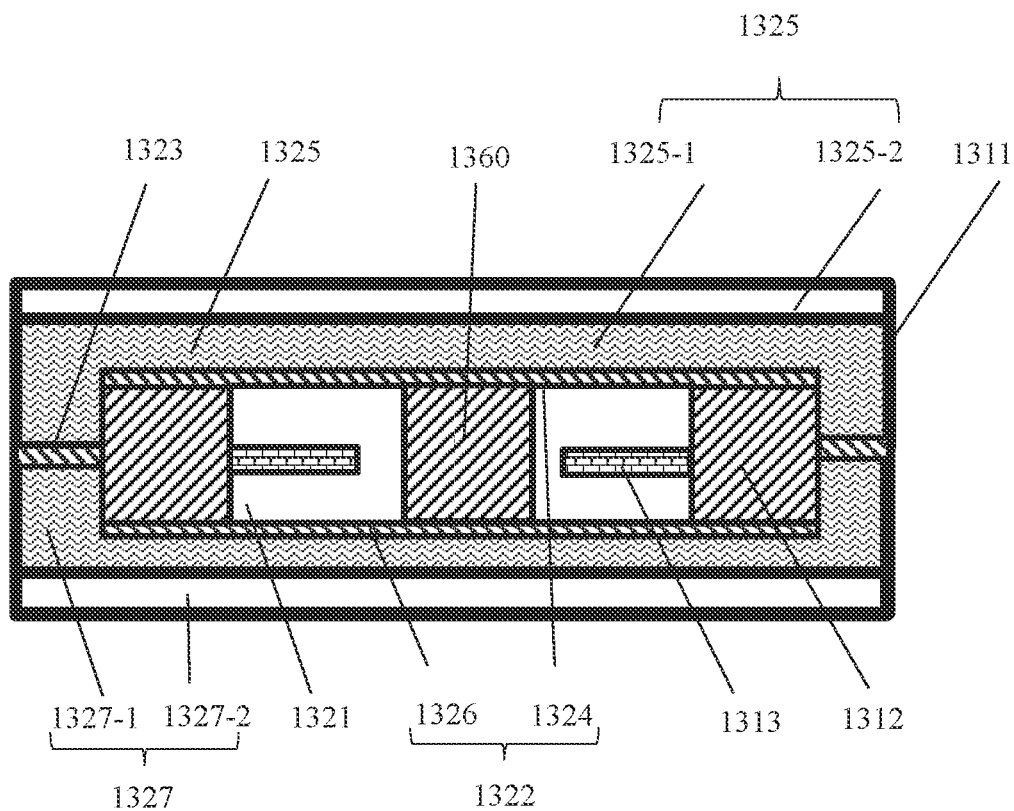
FIG. 14 is a cross-sectional view of an exemplary vibration sensing device according to some embodiments of the present disclosure.

As another example, the plate body 122 may include two rigid plates. The first plate body 1221 and the second plate body 1222 may divide the space in the housing 111 into multiple cavities, such as the first cavity 121, the second cavity 123, and the third cavity 125. The first cavity 121 may be defined by the first plate body 1221, the second plate body 1222, and the vibration transmission element 112. The second cavity 123 may be defined by the first plate body 1221 and a portion of the housing 111. The third cavity 125 may be defined by the second plate body 1222 and a portion of the housing 111. In some embodiments, the acoustic-electric conversion element 113 may be arranged in the first cavity 121. In some embodiments, the target cavity refers to a cavity filled with liquid in a plurality of cavities in the housing 111. For example, as shown in FIG. 1, when the liquid is filled in the first cavity 121, the target cavity may be the first cavity 121. For another example, as shown in FIGS. 11-13, when the liquid is filled in the second cavity, the target cavity may be the second cavity. For another example, as shown in FIG. 14, when the liquid is filled in the second cavity and the third cavity, the target cavity may be the second cavity and the third cavity.

In some embodiments, when the vibration sensing device 100 is configured to pick up or detect vibrations, an external vibration signal may be transmitted to the vibration sensor 110. Specifically, the housing 111 may transmit the received vibration signal to the vibration transmission element 112. The vibration transmission element 112 further transmits the vibration signal to the acoustic-electric conversion element 113. In some embodiments, the vibration sensor 110 has a first resonant frequency, which indicates that the acoustic-electric conversion element 113 will generate resonant under the action of the vibration signal at the first resonant frequency. The acoustic-electric conversion element 113 may make the frequency response curve of the vibration sensing device 100 have a resonant peak at the first resonant frequency. At the same time, the external vibration signal may be transmitted to the at least one vibration component through the housing 111 and/or the vibration transmission element 112, and the at least one vibration component may transmit the vibration signal to the acoustic-electric conversion element 113, which may generate an electrical signal after receiving the vibration signal transmitted through the vibration transmission element 112 and the at least one vibration component. The at least one vibration component may be configured to form one or more resonant systems. One of the one or more resonant systems may consist of a liquid in the target cavity and a plate body 122. In some embodiments, the resonant system may be represented as a spring-mass system. The liquid may be used as the mass block of the resonant system to provide the system mass for the resonant system, and the plate body 122 (e.g., a flexible plate) may be used as a spring to provide the system stiffness for the resonant system. The at least one vibration component is configured to receive the vibration of at least one of the housing or the vibration transmission element and transmit the vibration to the acoustic-electric conversion element 113. In some embodiments, the at least one vibration component may provide one or more second resonant frequencies for the vibration sensing device, which means that the vibration sensing device 100 will generate resonant under the action of the vibration signal at the second resonant frequency, thus generating a resonant peak at the second resonant frequency. At the second resonant frequency, the at least one vibration component may make the frequency response curve of the vibration sensing device 100 have a resonant peak at the second resonant frequency, thus, the sensitivity of the vibration sensing device 100 may be improved within a certain frequency band including the second resonant frequency. In some embodiments, the second resonant frequency may be the same or different from the first resonant frequency, that is, the acoustic-electric conversion element 113 has the same or different frequency response to the vibration transmitted by the vibration transmission element 112 and the vibration transmitted by the at least one vibration component. In some embodiments, the second resonant frequency may be less than the first resonant frequency.

In some embodiments, other cavities (e.g., the second cavity 123, the third cavity 125, etc.) in a plurality of cavities excluding the target cavity may be vacuumed or filled with gas (e.g., air, oxygen, nitrogen, inert gas, etc.). For example, the second cavity 123 and/or the third cavity 125 may be filled with gas. In some embodiments, when the other cavities in the plurality of cavities excluding the target cavity are vacuumed cavities or include a small amount of gas, the vacuumed cavity or a cavity including a small amount of gas has a small impact on the deformation and/or displacement of the plate body 122 caused by vibration. Therefore, the mechanical impact of the vacuumed cavity or the cavity including a small amount of gas on the resonant system may be negligible. In some embodiments, when a plurality of cavities contain gas (e.g., a gas having a relatively high air pressure) in addition to other cavities of the target cavity, the at least one vibration component may include the gas contained in the cavity. In some embodiments, when a plurality of cavities contain gas (e.g., a gas having a relatively high air pressure) in addition to other cavities of the target cavity, the at least one vibration component may include the gas contained in the cavity.

In some embodiments, the gas volume or air pressure contained in other cavities may be adjusted so that the gas in other cavities has a mechanical impact on the resonant system, and the gas in other cavities may be used as a part of the at least one vibration component to provide stiffness for the resonant system. That is to say, under the action of the received vibration signal, the gas in other cavities may generate vibration, thus causing the vibration of the first plate body 1221 and/or the second plate body 1222. In some embodiments, the stiffness provided by the gas in other cavities for the resonant system is related to the volume and pressure of the gas. For example, by using and/or designing a higher gas pressure (e.g., greater than $1.0 \times 10^5$ Pa), reducing the volume of other cavities or their combination may increase the system stiffness provided by the gas for the resonant system. In some embodiments, the ratio of the stiffness provided by the gas in the other cavity to the stiffness provided by the plate body 122 for the at least one vibration component may be in the range of 0.1-10. In some embodiments, the ratio of the stiffness provided by the gas in the other cavity to the stiffness provided by the plate body 122 for the at least one vibration component may be in the range of 0.1-1. In some embodiments, the ratio of the stiffness provided by the gas in other cavities to that provided by the plate body 122 may be 1-5. In some embodiments, the ratio of the stiffness provided by the gas in the other cavity to the stiffness provided by the plate body 122 for the at least one vibration component may be in the range of 5-8. In some embodiments, the ratio of the stiffness provided by the gas in the other cavity to the stiffness provided by the plate body 122 for the at least one vibration component may be in the range of 8-10. Regarding the influence of vibration components on the frequency response curve of the vibration sensing device 100, please refer to FIG. 2 and related descriptions.

Figure 2:
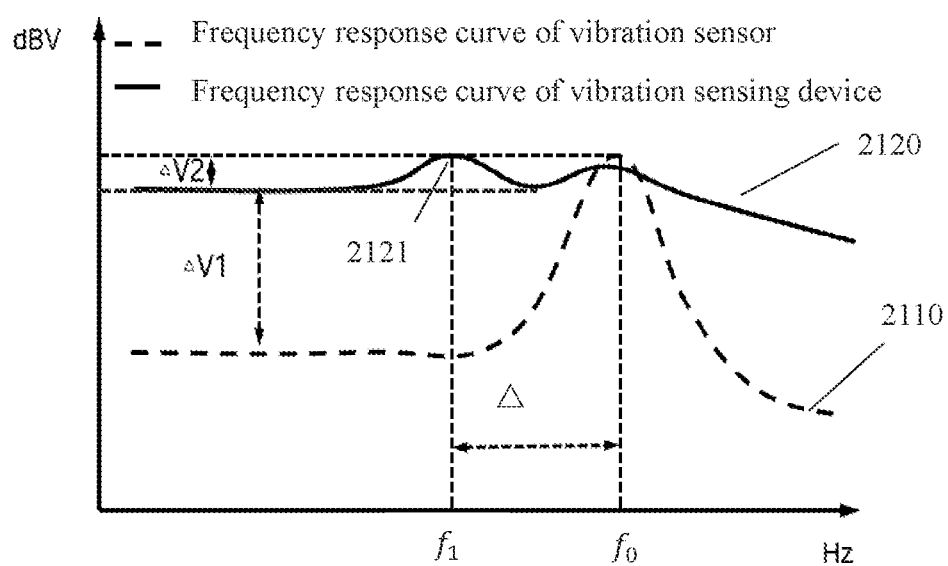
FIG. 2 is a frequency response curve of an exemplary vibration sensing device according to some embodiments of the present disclosure.

FIG. 2 is a frequency response curve of an exemplary vibration sensing device according to some embodiments of the present disclosure. As shown in FIG. 2, the frequency response curve 2110 represented by the dotted line is the frequency response curve of the vibration sensor (e.g., the vibration sensor 110). That is, the frequency response curve 2110 may be a frequency response curve when the vibration sensing device (e.g., the vibration sensing device 100) does not have a vibration component. The frequency response curve 2120 represented by the solid line is the frequency response curve of the vibration sensing device (e.g., the vibration sensing device 100). That is, the frequency response curve 2120 may be a frequency response curve when the vibration sensing device (e.g., the vibration sensing device 100) has a vibration component. The abscissa represents frequency in Hertz (Hz), and the ordinate represents sensitivity in decibel volts (dBV).

When the frequency response curve 2110 has a resonant peak at the frequency, the frequency may be called the resonant frequency of the vibration sensor (also called the first resonant frequency). At the frequency of the frequency response curve 2120, the at least one vibration component resonates under the action of the received vibration signal, so that the frequency band signal or frequency component containing the frequency in the vibration signal is amplified. The resonant frequency may be called the resonant frequency or resonant frequency of the at least one vibration component (also called the second resonant frequency). In some embodiments, the first resonant frequency is related to a structural parameter of the vibration sensor. The structural parameters of the vibration sensor may include a size, a structure, a stiffness, etc., of the housing (e.g., the housing 111) and/or the vibration transmission element (e.g., the vibration transmission element 112), and the size, mass, etc., of the acoustic electrical conversion element (e.g., the acoustic electrical conversion element 113). The second resonant frequency is related to the structural parameters of the at least one vibration component. The structural parameters of the at least one vibration component may include the type and mass of the liquid, the material, size, elastic coefficient, damping, etc., of the plate. The second resonant frequency may be expressed by formula (1):

$$f = 2\pi \sqrt{\frac{K}{m}}, \tag{1}$$

f is the second resonant frequency, K is the system stiffness of the resonant system, and m is the system mass of the resonant system.

In some embodiments, the system stiffness of the resonant system K may be provided by a plate body (e.g., a flexible plate), and the system mass may be provided by the liquid in the target cavity. In some embodiments, the system stiffness of the resonant system may be provided by a vibration pickup element (e.g., the vibration pickup element 823 in FIGS. 8 and 10, the vibration pickup element 1123 in FIG. 11, the vibration pickup element 1223 in FIG. 12, the vibration pickup element 1323 in FIG. 13 or 14, etc.), the system mass of the resonant system m may be provided by a liquid and/or other elements (e.g., a plate, a vibration transmission element, an acoustic-electric conversion element, a regulating element, a support element, etc., or a combination thereof). For details about the resonant system, please refer to FIG. 1 and FIGS. 3 to 22 and their related descriptions.

In some embodiments, the system stiffness and/or system mass of the resonant system may be adjusted by adjusting the structural parameters of the at least one vibration component, thereby adjusting the second resonant frequency of the vibration sensing device and/or the difference between the first resonant frequency and the second resonant frequency (e.g., Δf in FIG. 2), to obtain the desired or ideal frequency response of the vibration sensing device. For example, the second resonant frequency of the vibration sensing device may be reduced by selecting a plate body with a relatively large elastic coefficient, increasing the contact area between the plate body and the liquid, increasing the mass of the liquid, or a combination thereof. For another example, the second resonant frequency of the vibration sensing device may be increased by selecting a plate body with a relatively small elastic coefficient, reducing the contact area between the plate body and the liquid, reducing the mass of the liquid, or a combination thereof.

In some embodiments, the second resonant frequency $f_1$ and the first resonant frequency $f_0$ may be the same or different. For example, as shown in FIG. 2, the second resonant frequency $f_1$ may be smaller than the first resonant frequency $f_0$, so that the sensitivity of the vibration sensing device in a relatively low frequency range (e.g., the middle and low frequency band) may be improved. For another example, the second resonant frequency $f_1$ may be equal to (or roughly equal to) the first resonant frequency $f_0$, so that the quality factor (Q value) of the vibration sensing device in a specific frequency range (e.g., the frequency range containing the first resonant frequency) may be improved. For another example, the second resonant frequency $f_1$ may be greater than the first resonant frequency $f_0$, so that the sensitivity of the vibration sensing device in a relatively high frequency range may be improved.

In some embodiments, the at least one vibration component provides at least one second resonant frequency for the vibration sensing device, which may improve the sensitivity of the frequency response of the vibration sensing device in a specific frequency range, so that the frequency response curve is in a relatively wide frequency range flat. For example, as shown in FIG. 2, the difference between the peak and trough of the frequency response of the vibration sensor may be represented by (ΔV1+ΔV2). After the introduction of the second resonant frequency (after having a vibration component), the difference between the peak and trough of the frequency response of the vibration sensing device may be represented by Δ V2. Δ V2 is less than (Δ V1+Δ V2). The second resonant frequency provided by the at least one vibration component makes the frequency response curve of the vibration sensing device flat, and the sensitivity is high and stable in a relatively wide frequency range. In some embodiments, after introducing the second resonant frequency, the difference between the peak and the trough of the frequency response curve of the vibration sensing device may be in the range of 5 dBV to 15 dBV. In some embodiments, after introducing the second resonant frequency, the difference between the peak and the trough of the frequency response curve of the vibration sensing device may be in the range of 5 dBV to 10 dBV. In some embodiments, after introducing the second resonant frequency, the difference between the peak and the trough of the frequency response curve of the vibration sensing device may be in the range of 10 dBV to 15 dBV. In some embodiments, after introducing the second resonant frequency, the absolute value range of the difference Δ V2 between the peak and valley of the frequency response curve of the vibration sensing device and the difference (e.g., Δ V1) between the peak and valley of the frequency response of the vibration sensor (Δ V1+Δ V2) may be 15 dBV-40 dBV. In some embodiments, after introducing the second resonant frequency, the absolute value range of the difference Δ V2 between the peak and valley of the frequency response curve of the vibration sensing device and the difference (e.g., Δ V1) between the peak and valley of the frequency response of the vibration sensor (Δ V1+Δ V2) may be 15 dBV-20 dBV. In some embodiments, after the introduction of the second resonant frequency, the absolute value range of the difference Δ V2 between the peak and valley of the frequency response curve of the vibration sensing device and the difference (Δ V1+Δ V2) between the peak and valley of the frequency response of the vibration sensor may be 20 dBV-30 dBV. In some embodiments, after introducing the second resonant frequency, the absolute value range of the difference Δ V2 between the peak and valley of the frequency response curve of the vibration sensing device and the difference (e.g., Δ V1) between the peak and valley of the frequency response of the vibration sensor (A V1+Δ V2) may be 30 dBV-35 dBV.

Figure 3:
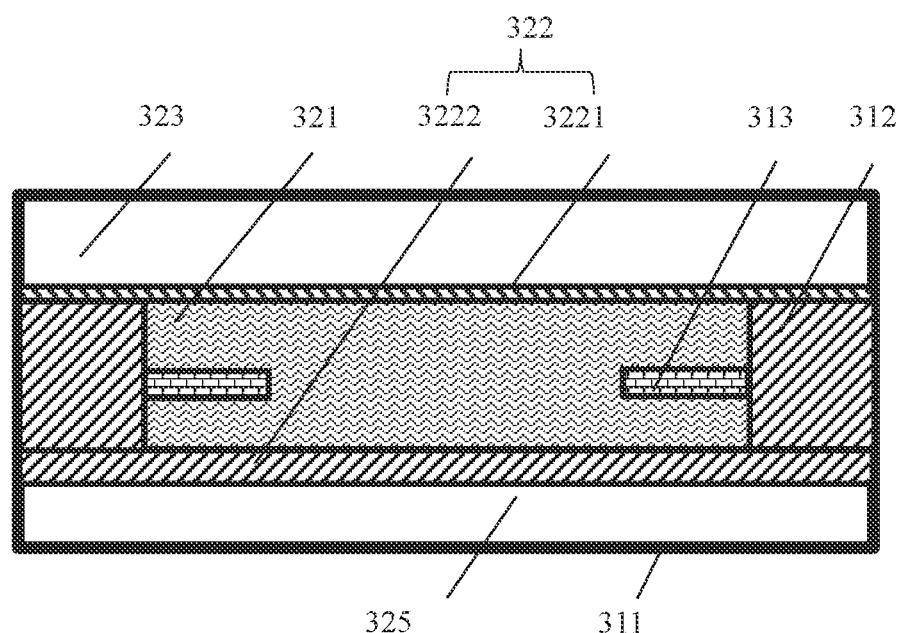
FIG. 3 is a cross-sectional view of an exemplary vibration sensing device according to some embodiments of the present disclosure.

FIG. 3 is a cross-sectional view of an exemplary vibration sensing device according to some embodiments of the present disclosure. As shown in FIG. 3, the vibration sensing device 300 may include a housing 311, a vibration transmission element 312, an acoustic-electric conversion element 313, a first cavity 321, a second cavity 323, a third cavity 325, and a plate body 322. One or more elements of the vibration sensing device 300 in FIG. 3 may be the same or similar to one or more elements of the vibration sensing device 100 in FIG. 1. For example, the housing 311, the vibration transmission element 312, the acoustic-electric conversion element 313, the first cavity 321, the second cavity 323, the third cavity 325, etc., in the vibration sensing device 300 may be the same or similar to the housing 111, the vibration transmission element 112, the acoustic-electric conversion element 113, the first cavity 121, the second cavity 123, the third cavity 125, etc., in the vibration sensing device 100.

The difference between the vibration sensing device 300 shown in FIG. 3 and the vibration sensing device 100 shown in FIG. 1 is that the first plate body 1221 and the second plate body 1222 in the vibration sensing device 100 are flexible plates. One of the first plate body 3221 and the second plate body 3222 in the vibration sensing device 300 is flexible plate, and the other is rigid plate. Following descriptions may take the first plate body 3221 as a flexible plate body and the second plate body 3222 as a rigid plate body for example.

In the vibration sensing device 300, the at least one vibration component may include a liquid filled in the first cavity 321 (i.e., the target cavity), a first plate body 3221, and a second plate body 3222. In the resonant system formed by the at least one vibration component, the liquid in the first cavity 321 may provide the system mass, and the first plate body 3221 and/or the second plate body 3222 may provide the system stiffness. Compared with the resonant system provided by the at least one vibration component of the vibration sensing device 100, since the second plate body 3222 is a rigid plate, the system stiffness provided by the first plate body 3221 and the second plate body 3222 in the vibration sensing device 300 may be greater than the system stiffness provided by the first plate body 1221 and the second plate body 1222 in the vibration sensing device 100. Under the same other conditions (e.g., the mass of liquid), according to Formula (1), the second resonant frequency of the vibration sensing device 300 may be greater than the second resonant frequency of the vibration sensing device 100. In this embodiment, the second resonant frequency of the resonant system provided by the at least one vibration component may be adjusted by setting the type of the plate body and/or the structural parameters of the plate body (e.g., the size of the elastic modulus), so as to obtain a desired or ideal frequency response curve.

Figure 4A:
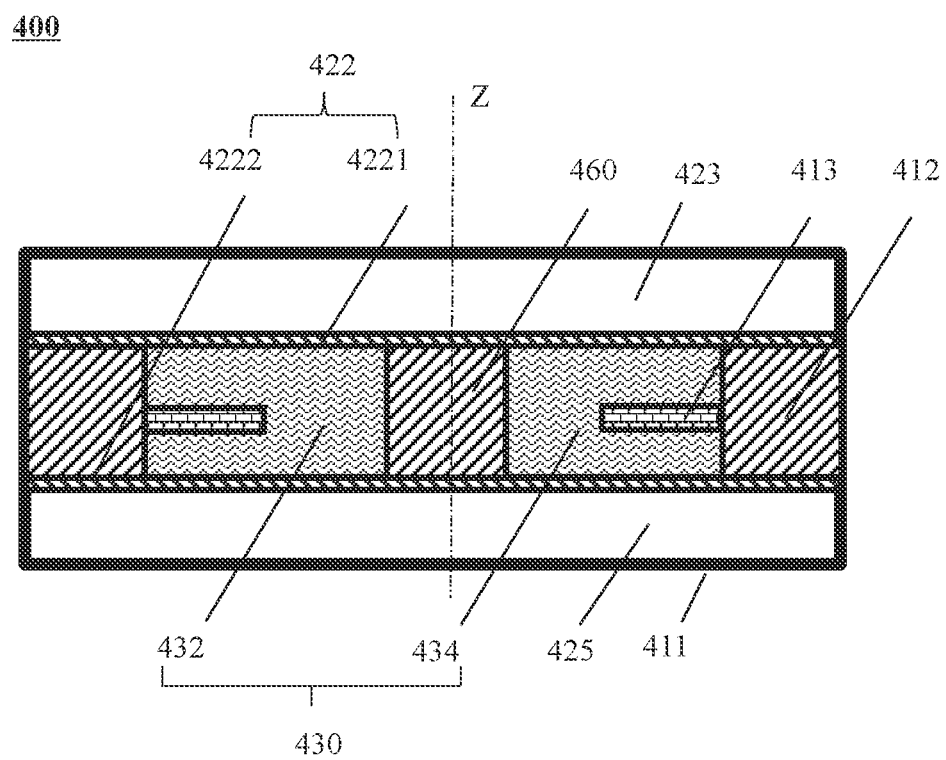
FIG. 4A is a cross-sectional view of an exemplary vibration sensing device according to some embodiments of the present disclosure.

FIG. 4A is a cross-sectional view of an exemplary vibration sensing device shown in accordance with some embodiments of the present disclosure. The vibration sensing device 400 may include a housing 411, a vibration transmission element 412, an acoustic-electric conversion element 413, a plate body 422, a first cavity 430 (i.e., a target cavity), a second cavity 423, and a third cavity 425. One or more elements of the vibration sensing device 400 may be the same or similar to one or more elements of the vibration sensing device 100 shown in FIG. 1. For example, the case 411, the acoustic-electric conversion element 413, the vibration transmission element 412, the plate body 422, etc., in the vibration sensing device 400 shown in FIG. 4 may be the same or similar to the case 111, the acoustic-electric conversion element 113, the vibration transmission element 112, the plate body 122, etc., in the vibration sensing device 100 shown in FIG. 1.

The difference between the vibration sensing device 400 shown in FIG. 4A and the vibration sensing device 100 shown in FIG. 1 is that the vibration sensing device 400 may further include an adjustment element 460. In some embodiments, the adjusting element 460 may be arranged in the target cavity 430. In some embodiments, the adjustment element 460 may divide the target cavity 430 into a first target cavity 432 and a second target cavity 434. The first target cavity 432 and/or the second target cavity 434 may be filled with liquid. The first target cavity 432 and the second target cavity 434 may be connected or disconnected. For example, as shown in FIG. 4A, the target cavity 430 may include a first cavity defined by the first plate body 4221, the second plate body 4222, and the vibration transmission element 412. For example, as shown in FIG. 4A, the target cavity 430 may include a first cavity defined by the first plate body 4221, the second plate body 4222, and the vibration transmission element 412. For another example, the adjusting element 460 may be arranged in the target cavity 430 and physically connected to one of the first plate body 4221 or the second plate body 4222 defining the target cavity 430. The first target cavity 432 and the second target cavity 434 may be connected to each other. For another example, the adjusting element 460 may be arranged in the target cavity 430 and is not connected to the first plate body 4221 and the second plate body 4222. The first target cavity 432 and the second target cavity 434 may be connected to each other.

In some embodiments, adjustment element 460 may be configured to define the size of target cavity 430. In some embodiments, the size of the target cavity 430 (e.g., the first target cavity 432 and the second target cavity 434) may be set and/or adjusted by setting a position, a size, a count and other parameters of the adjustment element 460. As an example only, when the length and height of the adjusting element 460 remain unchanged, the size of the target cavity 430 may be set and/or adjusted by setting and/or adjusting the width of the adjusting element 460. In some embodiments, during the use of the vibration sensor device 400, parameters such as the position, the size, and the quantity of the adjustment element 460 cannot be adjusted. In some embodiments, the position, the size, the quantity and other parameters of the adjusting element 460 may be adjusted during the use of the vibration sensor device 400, so that the position, the size, the quantity and other parameters of the adjusting element 460 may be adjusted during the use to adjust the size of the target cavity 430 (e.g., the first target cavity 432 and the second target cavity 434), the resonant frequency (i.e. the second resonant frequency) of the resonant system of the vibration sensing device 400 is further adjusted. For detailed description, please refer to the adjusting element 660 in FIG. 6.

The shape, the size, the material and other parameters of the adjusting element 460 may be determined according to actual needs. In some embodiments, the shape of the adjusting element 460 may include a cylinder, a prism, or other regular, or irregular shape. In some embodiments, the materials of the regulating element 460 may include, but are not limited to, one or more of semiconductor materials, metal materials, metal alloys, organic materials, and the like. In some embodiments, the adjustment element 460 may be made of corrosion-resistant waterproof material, such as polyimide, parylene, etc.

In some embodiments, when the first target cavity 432 and the second target cavity 434 are interconnected, the liquid in the plate body 422 and target cavity 430 may form a resonant system. Compared with the resonant system composed of the liquid in the plate body 122 and the target cavity 121 shown in FIG. 1, under the same other conditions (e.g., a liquid type, a target cavity volume, etc.), since the adjusting element 460 is provided, the system stiffness provided by the plate body 422 shown in FIG. 4A for the resonant system may be greater than that provided by the plate body 122 for the resonant system, and the liquid in the target cavity 430 provides less mass for the resonant system than the liquid in the target cavity 121 provides for the resonant frequency. According to Formula (1), the resonant frequency (i.e. the second resonant frequency) of the resonant system of the vibration sensing device 400 may be greater than the resonant frequency (i.e. the second resonant frequency) of the resonant system of the vibration sensing device 100.

It should be noted that in some embodiments, the first target cavity 432 and the second target cavity 434 may not be connected. When the first target cavity 432 and the second target cavity 434 are not connected, the plate body 422 may form a first resonant system with the liquid in the first target cavity 432, and the plate body 422 and the liquid in the second target cavity 434 form a second resonant system. In some embodiments, under the same other conditions (e.g., liquid types, densities, viscosities, volumes and other parameters in the first target cavity 432 and the second target cavity 434 are the same), the resonant frequencies of the first resonant frequency system and the second resonant system may be the same, so that the sensitivity and Q value of the vibration sensing device 400 at the resonant frequencies of the first resonant frequency system and/or the second resonant system may be improved. In some embodiments, different conditions may be set (e.g., the type, density, viscosity, volume and other parameters of the liquid in the first target cavity 432 and the second target cavity 434 are designed) to make the resonant frequencies of the first resonant frequency system and the second resonant system different, so that the sensitivity of the vibration sensing device 400 at different resonant frequencies of the first resonant frequency system and the second resonant system may be improved, and the sensitivity of the vibration sensing device 400 in a relatively wide frequency range may be improved.

When the first target cavity 432 and the second target cavity 434 are not connected, and the first target cavity 432 and the second target cavity 434 are filled with the same liquid with different sizes, the plate body 422 may form a first resonant system with the liquid in the first target cavity 432, and a second resonant system with the liquid in the second target cavity 434. The resonant frequencies of the first resonant frequency system and the second resonant frequency system may be different. For example, when the adjusting element 460 is set in the direction that the central axis Z of the vibration sensing device 400 is biased toward the first target cavity 432, the system mass of the first resonant system is less than the system mass of the second resonant system, so that the resonant frequency of the first resonant system is greater than the resonant frequency of the second resonant system. By setting the adjusting element 460, the count of resonant systems in the vibration sensing device 400 may be increased and/or the resonant frequency of the resonant system may be adjusted, so as to improve the sensitivity or reliability of the resonant system in a specific frequency range (e.g., the middle and low frequencies) and make the frequency response curve of the vibration sensing device 400 more stable in the required frequency band.

Figure 4B:
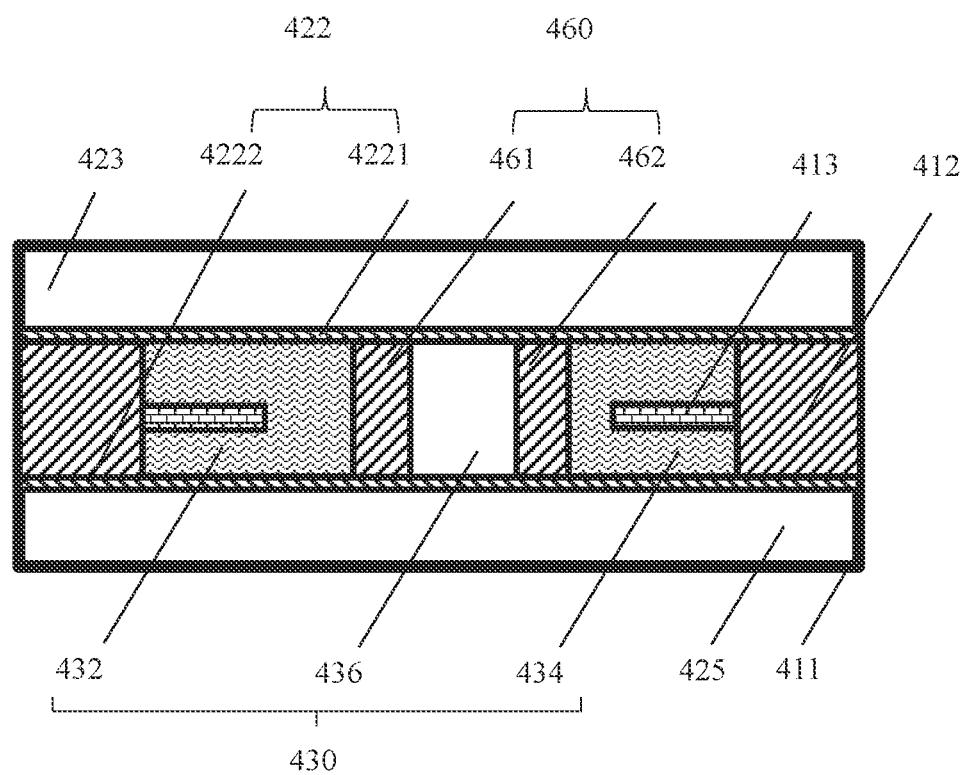
FIG. 4B is a cross-sectional view of an exemplary vibration sensing device according to some embodiments of the present disclosure.

FIG. 4B is a cross-sectional view of an exemplary vibration sensing device shown in accordance with some embodiments of the present disclosure. As shown in FIG. 4B, the vibration sensing device 420 may include a housing 411, a vibration transmission element 412, an acoustic-electric conversion element 413, a plate body 422, a first cavity 430 (i.e., a target cavity), a second cavity 423, a third cavity 425, and an adjusting element 460.

The difference between the vibration sensing device 420 shown in FIG. 4B and the vibration sensing device 400 shown in FIG. 4A includes that the adjusting element 460 may include a first adjusting element 461 and a second adjusting element 462. The first adjusting element 461 and the second adjusting element 462 may divide the space in the target cavity 430 into multiple cavities, for example, the first target cavity 432, the second target cavity 434, and the third target cavity 436. A plurality of target cavities may be filled with liquid, gas, solid or a combination thereof. For example, the first target cavity 432 and the second target cavity 434 are filled with liquid, and the third target cavity 436 may be vacuumed or filled with gas (e.g., air, oxygen, nitrogen, etc.).

The first adjusting element 461 and the second adjusting element 462 may be configured to define the sizes of the first target cavity 432 and the second target cavity 434 respectively by adjusting positions or sizes thereof, thereby adjusting the resonant frequency of the resonant system composed of the liquid in the plate body 422 and the first target cavity 432 and/or the resonant frequency of the resonant system composed of the liquid in the plate body 422 and the second target cavity 434. The third cavity 436 is set to be vacuumed or filled with gas, which may facilitate the adjustment and/or movement of the first adjustment element 461 and the second adjustment element 462, and may reduce the quality of the vibration sensing device 420 and improve user experience.

Figure 4C:
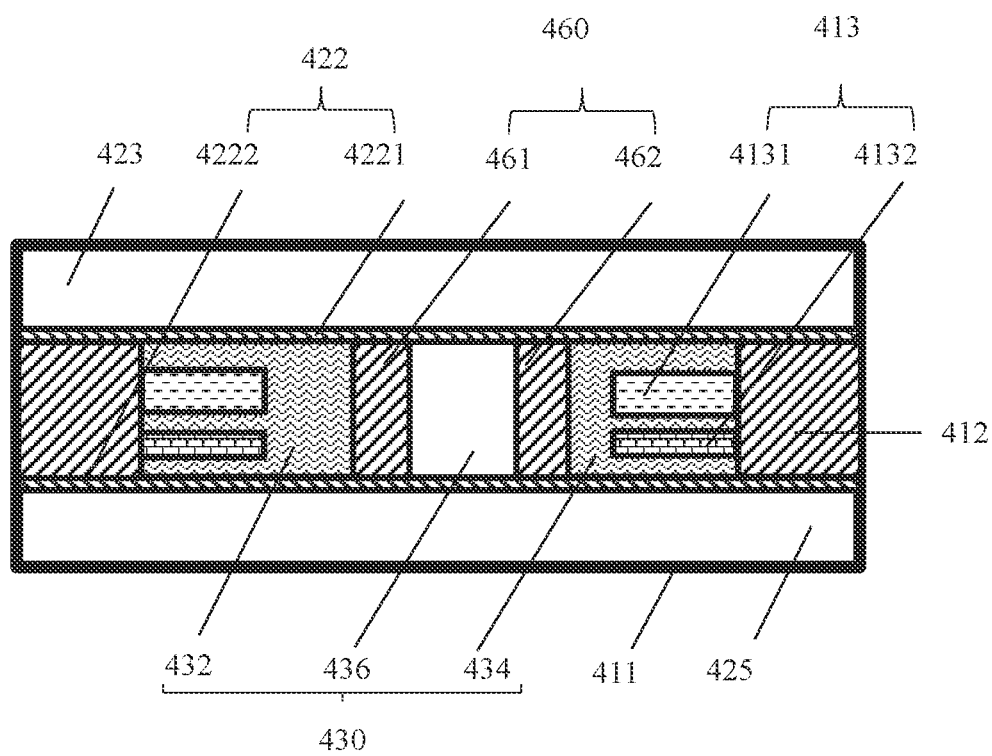
FIG. 4C is a cross-sectional view of an exemplary vibration sensing device according to some embodiments of the present disclosure.

FIG. 4C is a cross-sectional view of an exemplary vibration sensing device shown in accordance with some embodiments of the present disclosure. As shown in FIG. 4C, the vibration sensing device 440 may include a housing 411, a vibration transmission element 412, an acoustic-electric conversion element 413, a plate body 422, a first cavity 430 (i.e., a target cavity), a second cavity 423, a third cavity 425, and an adjusting element 460. The first cavity 430 may include a first target cavity 432, a second target cavity 434, and a third target cavity 436.

The difference between the vibration sensing device 440 shown in FIG. 4C and the vibration sensing device 420 shown in FIG. 4B includes that the acoustic-electric conversion element 413 of the vibration sensing device 420 shown in FIG. 4B may be a piezoelectric acoustic-electric conversion element, including a cantilever beam structure (or diaphragm structure), which may produce deformation under vibration, and the converse piezoelectric effect caused by the deformed cantilever beam structure may produce electrical signals. The acoustic-electric conversion element 413 in the vibration sensing device 440 shown in FIG. 4C may be a capacitive acoustic-electric conversion element. The acoustic-electric conversion element 413 includes a first cantilever structure 4131 and a second cantilever structure 4132. In some embodiments, the first cantilever beam structure 4131 and the second cantilever beam structure 4132 may be oppositely disposed, i.e., the first cantilever beam structure 4131 and the second cantilever beam structure 4132 have a facing area. For example, the lower surface of the first cantilever beam structure 4131 is opposite to all or part of the upper surface of the second cantilever beam structure 4132. In some embodiments, when the first cantilever beam structure 4131 and the second cantilever beam structure 4132 receive the same vibration from the vibration transmission element 412 or the first target cavity 432 or the second target cavity 434 at the same time, they may generate different degrees of vibration. deformation, so that the distance between the first cantilever beam structure 4131 and the second cantilever beam structure 4132 changes. The first cantilever beam structure 4131 and the second cantilever beam structure 4132 may convert the change of the distance between them into the change of capacitance, so as to realize the conversion of the vibration signal to the electric signal.

In some embodiments, the liquid filled in the plate body 422 and the first target cavity 432 and/or the liquid filled in the plate body 422 and the second target cavity 434 may form a vibration component, thereby providing a vibration sensor device 440 or multiple second resonant frequencies.

In some embodiments, the type, the position, the quantity, the material, etc., of the acoustic-electric conversion element 413 may be set according to actual needs. For example, the acoustic-electric conversion elements 413 of different lengths (the first cantilever structure 4131 and the second cantilever structure 4132) may be set so that the acoustic-electric conversion elements of different lengths have the same or different resonant frequencies. For another example, a different count of acoustic-electric conversion elements may be arranged on the inner wall of the target cavity 430 or on the side wall of the target cavity 430 where the vibration transmission element 412 is located. For another example, the spacing between the first cantilever 4131 and the second cantilever 4132 in the acoustic-electric conversion element 413 may be set as required (e.g., the desired or ideal second resonant frequency), and such deformations are within the protection scope of the disclosure.

Figure 5:
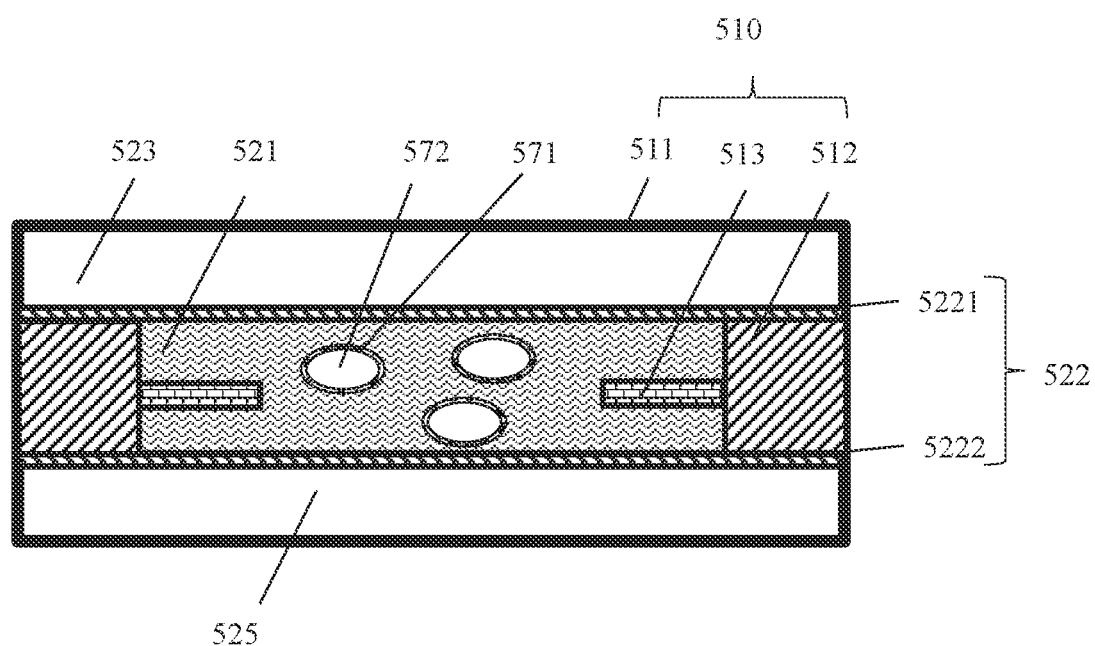
FIG. 5 is a cross-sectional view of an exemplary vibration sensing device according to some embodiments of the present disclosure.

FIG. 5 is a cross-sectional view of an exemplary vibration sensing device according to some embodiments of the present disclosure. As shown in FIG. 5, the vibration sensing device 500 may include a vibration sensor 510, a plate body 522, a first cavity 521, a second cavity 523, and a third cavity 525. The vibration sensor 510 may include a housing 511, a vibration transmission element 512, and an acoustic-electric conversion element 513.

One or more elements in the vibration sensing device 500 shown in FIG. 5 may be the same as or similar to one or more elements in the vibration sensing device 100 shown in FIG. 1. For example, the housing 511, the vibration transmission element 512, the acoustic-electric conversion element 513, the plate body 522, the plate body 522, in the vibration sensor 510 of the vibration sensing device 500 may be the same or similar to the housing 111, the vibration transmission element 112, the acoustic-electric conversion element 113, the plate body 122, and the vibration sensor 110, etc., The difference between the vibration sensing device 500 shown in FIG. 5 and the vibration sensing device 100 shown in FIG. 1 includes that the target cavity 521 (i.e., the first cavity 521) of the vibration sensing device 500 may include a first sub-cavity and a second sub-cavity. The first sub-cavity may be configured to accommodate liquid, and the second sub-cavity may be configured to accommodate one or more of gas, liquid, and fixation. The first sub-cavity may be the remaining space in the target cavity except the space occupied by the second sub-cavity. In some embodiments, the second sub-cavity may include one or more sub-cavities 572 defined by the elastic vibration membrane 571. In some embodiments, the sub-cavity 572 may be a closed cavity defined by the elastic membrane 571. In some embodiments, the elastic vibration membrane 571 may define the size, shape and other structural parameters of the sub-cavity 572. For example, the larger the area of the elastic vibration membrane 571 and the larger the volume of the sub-cavity 572, the more fillers may be accommodated. For another example, if the airtight elastic membrane 571 forms a sphere, the shape of the sub-cavity 572 is a sphere. In some embodiments, the shape of the sub-cavity 572 includes, but is not limited to, a sphere, a prism, a cone, an ellipsoid, etc., The material of the elastic vibration membrane 571 may be the same as or different from that of the plate body 522. In some embodiments, the elastic vibration membrane 571 may include a film like material (e.g., polyester membrane, nylon membrane, plastic membrane, composite membrane, etc., or a combination thereof). The size and shape of the elastic vibration membrane 571 may be set according to the actual situation (e.g., the required volume of the sub-cavity 572, the shape of the sub-cavity 572, the location of the sub-cavity 572, etc.). In some embodiments, the elastic vibration membrane 571 may also be an interface between the liquid and the gas without adding other materials. In some embodiments, when there are multiple sub-cavities 572, the structural parameters (e.g., size, shape, etc.) of different sub-cavities 572 may be the same or different. In some embodiments, the sub-cavity 572 may be formed by air that is not expelled from the target cavity. For example, when the amount of liquid filled is less than the volume of the target cavity, bubbles will be left in the target cavity. In some embodiments, the sub-cavity 572 may also be formed by setting hydrophobic materials on the inner surface of the target cavity or on the surface of the component inside the target cavity. The sub-cavity 572 is attached to the surface of the hydrophobic material. For example, a superhydrophobic coating may be provided on the internal surface partial area of the target cavity 521 or the internal component partial surface thereof.

In some embodiments, sub-cavity 572 contains a filler. The filler contained within the sub-cavity 572 may serve to maintain the shape of the sub-cavity 572. The filler may include one or more of solid, gas, and liquid. In some embodiments, solids may include flexible solids (e.g., resins, fibers, etc.), compressible solids (e.g., sponges, foamed plastics, etc.), granular solids, etc., or other solids that meet their performance requirements, or one or more combinations thereof. In some embodiments, the liquid may include oil (e.g., silicone oil, glycerin, lubricating oil, etc.), water (e.g., pure water, aqueous solution of other inorganic or organic substances, etc., (e.g., salt water)), oil-water emulsion or other liquid meeting the performance requirements, or one or more combinations thereof. In some embodiments, the gas may include oxygen, water vapor, carbon dioxide, refrigerant, etc., inert gas (e.g., helium, neon, argon, etc.) or other gas meeting its performance requirements, or one or more combinations thereof.

In some embodiments, the filler may be compressed to some extent. For example, the sub-cavity 572 is filled with liquid and gas. When the sub-cavity 572 is compressed and deformed, the volume of gas may be compressed and reduced, and the liquid may also deform with the deformation of the sub-cavity 572. In some embodiments, the fillers in different sub cavities 572 may be the same or different.

The sub-cavity 572 in the target cavity 521 has a certain volume. For example, the ratio of the volume of the sub-cavity to the target cavity or liquid may be, for example, any value between 5% and 95%. By way of example only, the ratio of the volume of the sub-cavity 572 to the volume of the liquid may be 5%-90%. In some embodiments, the ratio of the volume of the sub-cavity 572 to the volume of the liquid may be 10%-80%. In some embodiments, the ratio of the volume of the sub-cavity 572 to the volume of the liquid may be 20%-60%. In some embodiments, the ratio of the volume of the sub-cavity 572 to the volume of the liquid may be 30%-50%. The count of sub cavities 572 may be set according to actual conditions, for example, 1, 2, 3, 4 or more.

In some embodiments, the elastic vibration membrane 571, the sub-cavity 572, and the filler contained in the sub-cavity may be regarded as an elastic whole, which may deform when subjected to pressure. For example, the vibration signal transmitted by the liquid may compress the elastic whole, causing deformation and/or displacement of the elastic vibration membrane 571, the sub-cavity 572, and the filler contained in the sub-cavity. The plate body 5221, the plate body 5222, the sub-cavity 572 and the fillings thereof, and the liquid filled in the first sub-cavity may form a vibration component to provide a second resonant system for the vibration sensing device 500. The plate body 5221, the plate body 5222, the sub-cavity 572 and their fillings may be used as the springs of the resonant system to provide the system stiffness for the resonant system. The liquid filled in the first sub-cavity of the target cavity 521 may be used as the mass block of the resonant system to provide the system mass for the resonant system. Compared with the vibration sensing device 100 filled with liquid, the vibration sensing device 500 filled with liquid and the sub-cavity 572 may have excessive stiffness and damping, which may affect the sensitivity of the sensing device 100, because the liquid in the target cavity 521 (e.g., the first sub-cavity) of the vibration sensing device 100 is incompressible. Since the second sub-cavity (e.g., sub-cavity 572) in the target cavity 521 of the vibration sensing device 500 is compressible and has small stiffness, the equivalent stiffness of the plate body 522 and the sub-cavity 572 is small, and the second resonant frequency provided by the at least one vibration component for the vibration sensing device 500 may be lower than the second resonant frequency of the vibration sensing device 100. By setting a sub-cavity (e.g., sub-cavity 572) in the target cavity 521, the vibration sensing device 100 may be provided with a lower second resonant frequency, and the frequency response of the vibration sensing device 500 may be effectively controlled, thus improving the overall sensitivity of the vibration sensing device 500. The frequency response curve is relatively flat, and the effective bandwidth (satisfying the flat frequency response condition) may cover a large range. In some embodiments, by adjusting the ratio of the volume of the sub-cavity to the volume of the liquid in the vibration sensing device 500, the position of the second resonant frequency of the vibration sensing device 500 may be adjusted, so that the vibration sensing device 500 may be optimized. The frequency response curve is flatter.

Figure 6:
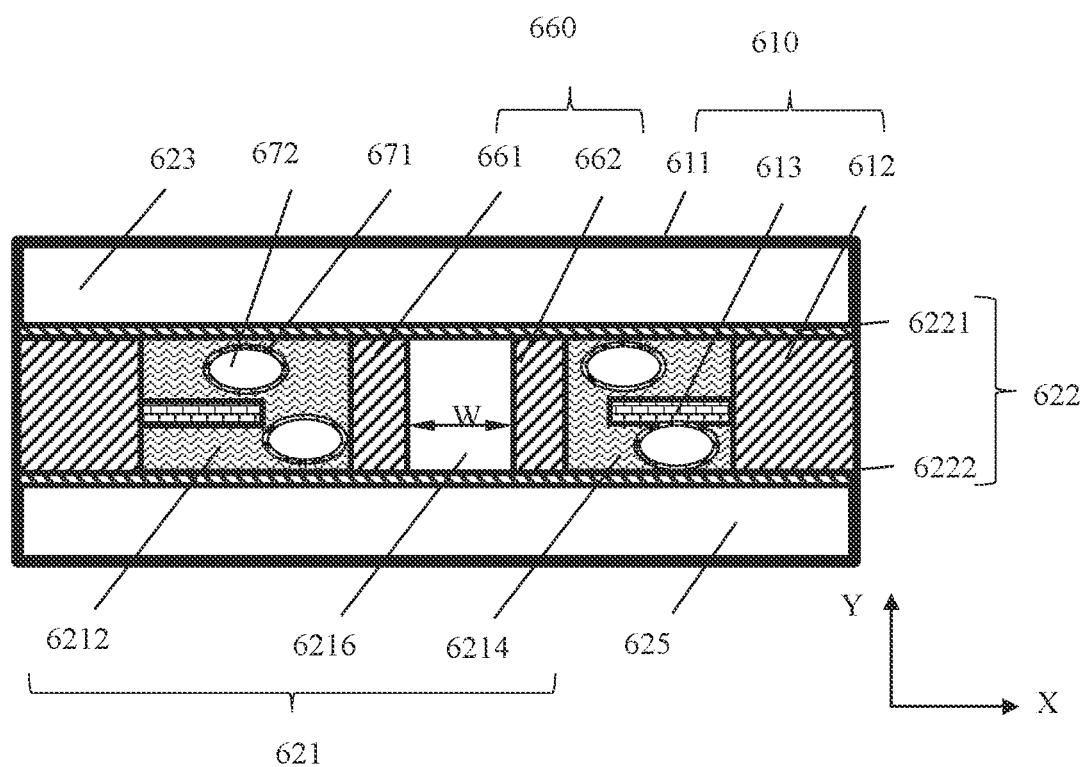
FIG. 6 is a cross-sectional view of an exemplary vibration sensing device according to some embodiments of the present disclosure.

FIG. 6 is a cross-sectional view of an exemplary vibration sensing device shown in accordance with some embodiments of the present disclosure. As shown in FIG. 6, the vibration sensing device 600 may include a vibration sensor 610, a plate body 622, a first cavity 621 (also referred to as a target cavity), a second cavity 623 and a third cavity 625. The vibration sensor 610 may include a housing 611, a vibration transmission element 612 and an acoustic-electric conversion element 613.

One or more elements of the vibration sensing device 600 shown in FIG. 6 may be the same or similar to one or more elements of the vibration sensing device 500. For example, the housing 611, the vibration transmission element 612, the acoustic-electric conversion element 613, the plate body 622, the elastic vibration membrane 671, the sub-cavity 672, etc., in the vibration sensing device 600 may be the same or similar with the housing 511, the vibration transmission element 512, the acoustic-electric conversion element 513, the plate body 522, the elastic membrane 571, the sub-cavity 572, etc., in the vibration sensing device 500.

In some embodiments, the difference between the vibration sensing device 600 shown in FIG. 6 and the vibration sensing device 500 shown in FIG. 5 includes that the vibration sensing device 600 may include an adjusting element 660. The adjusting element 660 is arranged in the target cavity 621 or a part of the cavity wall for forming the target cavity, and is configured to define and/or adjust the size of the target cavity 621. In some embodiments, the adjustment element 660 may include a first adjustment element 661 and a second adjustment element 662. The first adjustment element 661 and the second adjustment element 662 may divide the target cavity 621 into a first target cavity 6212 and a second target cavity 6214. The first target cavity 6212 may be defined by a part of the first plate body 6221, a part of the second plate body 6222, the first adjusting element 661 and the vibration transmission element 612. The second target cavity 6214 may be defined by a part of the first plate body 6221, a part of the second plate body 6222, the second adjusting element 662, and the vibration transmission element 612. In some embodiments, the cavity 6216 may be formed when the first adjustment element 661 and the second adjustment element 662 are separated. The cavity 6216 may be defined by a portion of the first plate body 6221, a portion of the second plate body 6222, a first adjusting element 661, and a second adjusting element 662. The first target cavity 6212 and/or the second target cavity 6214 are filled with liquid and/or provided with a sub-cavity 672. The cavity 6216 is vacuumed or filled with gas.

In some embodiments, the dimensions of the first target cavity 6212 and the second target cavity 6214 defined by the adjusting element 660 (e.g., the first adjusting element 661 and/or the second adjusting element) may be predetermined. For example, the dimensions of the first target cavity 6212 and the second target cavity 6214 may be defined during a production or component of the vibration sensing device 600. Due to the compressibility of the sub-cavity 672, in some embodiments, the position of the adjusting element 660 may be adjusted during or after the production and component of the vibration sensing device 600 to adjust the dimensions of the first target cavity 6212 and the second target cavity 6214. For example, the dimensions of the first target cavity 6212 and/or the second target cavity 6214 may be adjusted by adjusting a transverse dimension W along the X-axis direction between the first adjusting element 661 and the second adjusting element 662 (i.e., the cavity 6216). As an example only, the vibration sensing device 600 may include a circuit driving element that is connected to the first adjusting element 661 and/or the second adjusting element 662. The circuit driving element may be configured to drive the first adjusting element 661 and/or the second adjusting element 662 to move (e.g., along the X-axis direction) to adjust the transverse dimension W along the X-axis direction between the first adjusting element 661 and the second adjusting element 662, thereby adjusting the dimensions of the first target cavity 6212 and/or the second target cavity 6214. The circuit driving element may be configured as an element that drives the movement of other elements, such as the first adjusting element 661, the second adjusting element 662, etc. In some embodiments, the circuit driving element may adopt one or more of piezoelectric driving, electrostatic driving, electromagnetic driving, and other driving methods.

It should be noted that since the compressibility of the sub-cavity 672 defined by the elastic vibration membrane 671 is relatively high, the step of driving the adjusting element 660 to define the size of the target cavity may be performed before the target cavity 621 is filled with liquid, or after the target cavity 621 is filled with liquid and the sub-cavity 672 defined by the elastic vibration membrane 671 is set, or during the process of using the vibration sensing device 600.

Figure 7:
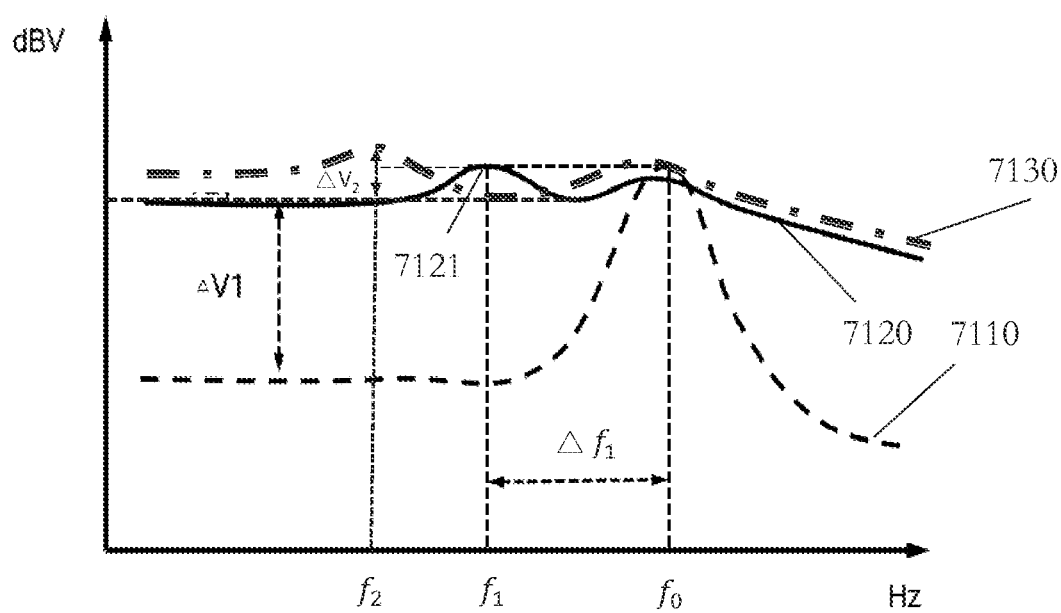
FIG. 7 is a frequency response curve of an exemplary vibration sensing device according to some embodiments of the present disclosure.

On the basis of adjusting the resonant frequency of the resonant system in the vibration sensing device 600 by setting the sub-cavity 672 defined by the elastic film 671, the system stiffness and/or system mass of the resonant system may be adjusted by setting and/or adjusting the adjusting element 660, defining and/or adjusting the size of the target cavity, the contact area between the plate body 622 and the liquid in the target cavity 621, the equivalent stiffness of the sub-cavity 672 and the liquid in the target cavity 621. Thus, the resonant frequency of the resonant system in the vibration sensing device 600 is adjusted again to obtain the desired or ideal resonant frequency (i.e., the second resonant frequency). For illustration purposes, FIG. 7 is a frequency response curve of an exemplary vibration sensing device shown in accordance with some embodiments of the present disclosure. As shown in FIG. 7, the abscissa of the frequency response curve represents the frequency in Hz, and the ordinate represents the sensitivity in dBV. The frequency response curve 7110 represented by the dotted line is the frequency response curve of the vibration sensor 610 of the vibration sensing device 600, and the vibration sensor 610 has a first resonant frequency $f_0$. The frequency response curve 7120 represented by the solid line is the frequency response curve of the first adjusting element 661 and the second adjusting element 662 in the adjusting element 660 at the first position and the second position respectively after the vibration sensor 600 is introduced into the second resonant system provided by the at least one vibration component composed of the plate body 622, the liquid and the sub-cavity. The at least one vibration component provides the second resonant frequency $f_1$ for the vibration sensor 600. The frequency response curve 7130 indicated by the dotted line is the frequency response curve when the lateral dimension W of the third target cavity 6216 along the X-axis direction is adjusted by the adjusting element 660. The first adjusting element 661 and the second adjusting element 662 in the adjusting element 660 are respectively at the third and fourth positions. The third position may be different from the first position, and the fourth position may be different from the second position. As an example only, the adjusting element 661 may move in the positive direction of the X axis, the adjusting element 662 may move in the negative direction of the X axis, the moving distance of the adjusting element 661 and the adjusting element 662 may be the same or different, the moving distance of the adjusting element 661 and the adjusting element 662 may reduce the transverse dimension W, so that the volume of the target cavity 6212 and the second target cavity 6214 may increase, the contact area between the plate body 622 and the liquid in the first target cavity 6212 and the second target cavity 6214 increases, and the compression ratio of the liquid and/or sub-cavity 672 in the first target cavity 6212 and the second target cavity 6214 decreases, which is equivalent to reducing the system stiffness of the resonant system, so that the second resonant frequency of the resonant system decreases from $f_1$ to $f_2$. As shown in FIG. 7, compared to the frequency response curve 7120, the second harmonic peak of the frequency response curve 7130 is shifted to the left. By setting the adjusting element 660, the resonant frequency of the vibration sensing device 600 may be reduced (e.g., from $f_1$ to $f_2$), and the vibration sensing device 600 has a high sensitivity in a wide frequency range. For example, before the transverse dimension W is reduced by adjusting the element 660, the target frequency response curve 7120 has a relatively high sensitivity in the $(f_1-f_0)$ frequency range. After the transverse dimension W is reduced by adjusting the element 660, the frequency response curve 7130 of the vibration sensing device 600 has relatively high sensitivity in the $(f_2-f_0)$ frequency range, where $(f_2-f_0)$ is greater than $(f_1-f_0)$.

In some embodiments, the at least one vibration component provides at least one second resonant frequency for the vibration sensing device, which may improve the sensitivity of the frequency response of the vibration sensing device in a specific frequency range, making the frequency response curve flatter in a relatively wide frequency range. For example, as shown in FIG. 7, the difference between the peak and trough of the frequency response of the vibration sensor may be expressed by ($\Delta$ V1+$\Delta$ V2). After the introduction of the second resonant frequency (i.e., after having a vibration component), the difference between the peak and trough of the frequency response of the vibration sensing device may be represented by $\Delta$ V2. $\Delta$ V2 is less than ($\Delta$ V1+$\Delta$ V2), i.e., the second resonant frequency provided by the at least one vibration component makes the frequency response curve of the vibration sensing device flatter, and the sensitivity is higher and more stable in a relatively wide frequency range. In some embodiments, after introducing the second resonant frequency, the difference between the peak and the trough of the frequency response curve of the vibration sensing device may be in the range of 5 dBV to 15 dBV. In some embodiments, after introducing the second resonant frequency, the difference between the peak and the trough of the frequency response curve of the vibration sensing device may be in the range of 5 dBV to 10 dBV. In some embodiments, after introducing the second resonant frequency, the difference between the peak and the trough of the frequency response curve of the vibration sensing device may be in the range of 10 dBV to 15 dBV. In some embodiments, after introducing the second resonant frequency, the absolute value range of the difference $\Delta$ V2 between the peak and valley of the frequency response curve of the vibration sensing device and the difference (e.g., $\Delta$ V1) between the peak and valley of the frequency response of the vibration sensor ($\Delta$ V1+$\Delta$ V2) may be 15 dBV-40 dBV. In some embodiments, after introducing the second resonant frequency, the absolute value range of the difference $\Delta$ V2 between the peak and valley of the frequency response curve of the vibration sensing device and the difference (e.g., $\Delta$ V1) between the peak and valley of the frequency response of the vibration sensor ($\Delta$ V1+$\Delta$ V2) may be 15 dBV-20 dBV. In some embodiments, after the introduction of the second resonant frequency, the absolute value range of the difference $\Delta$ V2 between the peak and valley of the frequency response curve of the vibration sensing device and the difference ($\Delta$ V1+$\Delta$ V2) between the peak and valley of the frequency response of the vibration sensor may be 20 dBV-30 dBV. In some embodiments, after introducing the second resonant frequency, the absolute value range of the difference $\Delta$ V2 between the peak and valley of the frequency response curve of the vibration sensing device and the difference (e.g., $\Delta$ V1) between the peak and valley of the frequency response of the vibration sensor (A V1+$\Delta$ V2) may be 30 dBV-35 dBV.

Figure 8:
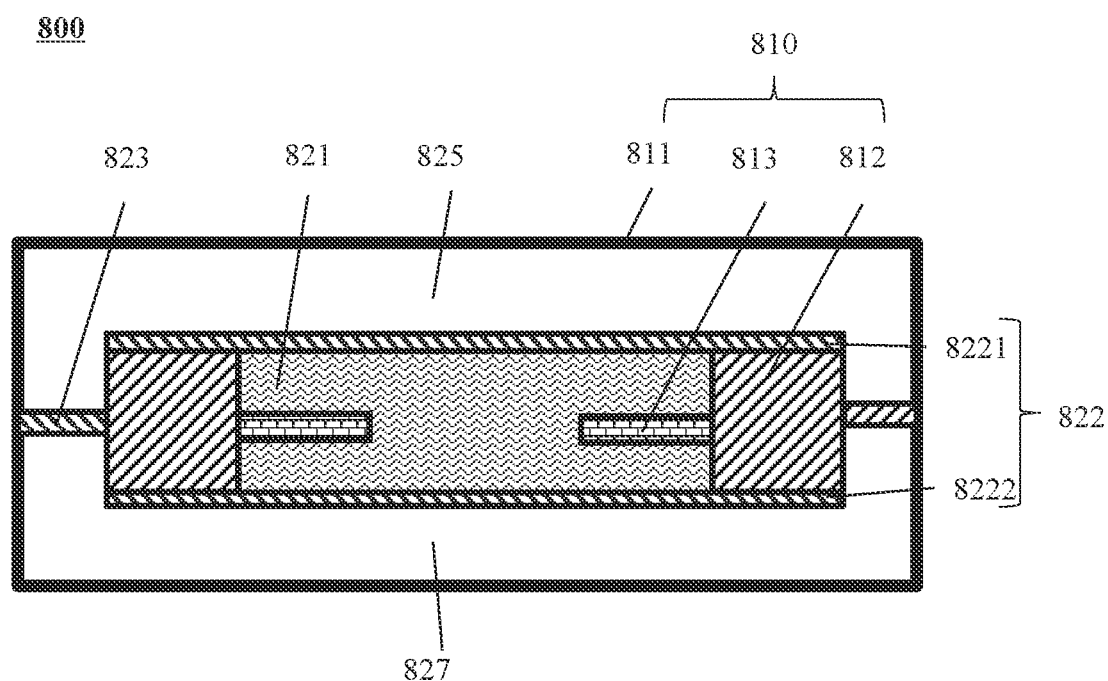
FIG. 8 is a cross-sectional view of an exemplary vibration sensing device according to some embodiments of the present disclosure.

FIG. 8 is a cross-sectional view of an exemplary vibration sensing device according to some embodiments of the present disclosure. As shown in FIG. 8, the vibration sensing device 800 may include a sensor 810, a plate body 822, a first cavity 821, a second cavity 825, and a third cavity 827. The sensor 810 may include a housing 811, a vibration transmission element 812, and an acoustic-electric conversion element 813. One or more elements of the vibration sensing device 800 shown in FIG. 8 may be the same or similar to one or more corresponding elements of the vibration sensing device 100 shown in FIG. 1. For example, the housing 811, vibration transmission element 812, acoustic-electric conversion element 813, plate body 822, etc., in the vibration sensing device 800 may be the same or similar to the housing 111, vibration transmission element 112, acoustic-electric conversion element 113, plate body 122, etc., in the vibration sensing device 100.

The difference between the vibration sensing device 800 shown in FIG. 8 and the vibration sensing device 100 shown in FIG. 1 is that the at least one vibration component of the vibration sensing device 800 further includes a vibration pickup element 823. The vibration pickup element 823 may be configured to generate vibration in response to an external vibration signal transmitted to the housing 811. In some embodiments, the vibration pickup element 823 may be arranged between the housing 811 and the vibration transmission element 812. For example, one end of the vibration pickup element 823 may be physically connected to the housing 811, and the other end may be physically connected to the vibration transmission element 812. The first cavity 821 may be defined and/or formed by the plate body 822 and the vibration transmission element 812. The third cavity 825 may be defined and/or formed by at least a portion of the housing 811, the vibration pickup element 823, and the second plate body 8222. The third cavity 825 may be defined and/or formed by at least a portion of the housing 811, the vibration pickup element 823, and the second plate body 8222. The liquid is filled in the first cavity 821, i.e., the first cavity 821 is the target cavity. The vibration pickup element 823 may be directly or indirectly connected to the acoustic-electric conversion element 813 (e.g., connected through the vibration transmission element 812 as shown in FIG. 8), so that the acoustic-electric conversion element 813 receives the vibration of the vibration pickup element 823, and converts the received vibration signal into an electrical signal for output. In some embodiments, the vibration pickup element 823 may include an elastic member or a rigid member, and its material may be the same or different from that of the plate body 822 (e.g., the first plate body 8221 and/or the second plate body 8222).

In some embodiments, when the vibration pickup element 823 is a rigid member, the vibration pickup element 823 may be configured to transmit a vibration signal. For example, the vibration pickup element 823 may transmit the vibration signal generated by the housing 811 to the vibration transmission element 812. In some embodiments, the material of the vibration pickup element 823 may be the same as or different from that of the vibration transmission element 812.

In some embodiments, the at least one vibration component of the vibration sensing device 800 may provide at least one resonant system for the vibration sensing device 800. For example, when the vibration pickup element 823 is an elastic member, at least one resonant system may be the vibration sensing device 800, the at least one resonant system may include a first resonant system and a second resonant system. The first resonant system may be composed of the liquid in the target cavity 821 and the plate body 822, and the second resonant system may be composed of the vibration transmission element 812, the acoustic-electric conversion element 813, the liquid in the target cavity 821, the vibration pickup element 823, and the plate body 822. In the first resonant system, the plate body 822 (e.g., the first plate body 8221 and/or the second plate body 8222) may be used as the spring of the first resonant system to provide system stiffness, and the liquid in the target cavity 821 may be used as the mass block of the first resonant system to provide system mass. In the second resonant system, the vibration pickup element 823 may be used as the spring of the second resonant system to provide the system stiffness, and the vibration transmission element 812, the acoustic-electric conversion element 813, the liquid in the target cavity 821 and the plate body 822 may be used as the mass block of the second resonant system to provide the system mass.

Figure 9:
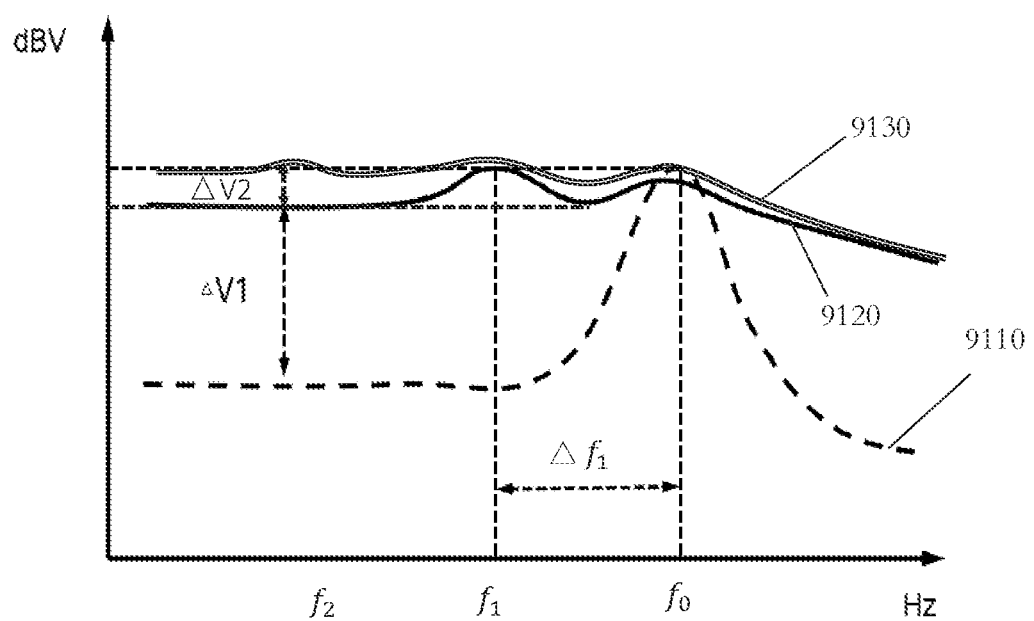
FIG. 9 is a frequency response curve of an exemplary vibration sensing device according to some embodiments of the present disclosure.

In some embodiments, the first resonant system and the second resonant system may provide at least two second resonant frequencies for the vibration sensing device 800, i.e., the setting of the vibration pickup element 823 may introduce a new second resonant frequency on the basis of a second resonant frequency of the vibration sensing device 800. For the convenience of description, FIG. 9 is taken as an example. FIG. 9 is a frequency response curve of an exemplary vibration sensing device according to some embodiments of the present disclosure. As shown in FIG. 9, the frequency response curve 9110 represented by the dotted line is the frequency response curve of the vibration sensor 810, for example, the frequency response curve when the vibration sensor 800 is not provided with a vibration component and a vibration pickup element 823. The frequency response curve 9120 indicated by the solid line is the frequency response curve of the vibration sensing device (e.g., the vibration sensing device 100) when the at least one vibration component is provided but the vibration pickup element 823 is not provided. The frequency response curve 9130 represented by double solid lines may be the frequency response curve of a vibration sensing device (e.g., a vibration sensing device 800) provided with a vibration component and a vibration pickup element 823. The abscissa represents the frequency in Hz, and the ordinate represents the sensitivity in dBV.

The vibration sensor 810 has a resonant peak at the first resonant frequency $f_0$. The introduction of the first resonant system allows the vibration sensing device to have a resonant peak at the second resonant frequency $f_1$, which may be the same or different from the first resonant frequency $f_1$. For example, as shown in FIG. 9, the second resonant frequency $f_1$ may be less than the first resonant frequency $f_0$, the difference between the peak and the valley of the frequency response curve of the vibration sensing device with the at least one vibration component and the vibration pickup element 823 is $\Delta$ V2, when the at least one vibration component and the vibration pickup element 823 are not set, the difference between the peak and the valley of the frequency response curve of the vibration sensing device is ($\Delta$ V1+$\Delta$ V2), and $\Delta$ V2 is less than ($\Delta$ V1+$\Delta$ V2), that is to say, the introduction of the second resonant frequency $f_1$ improves the sensitivity of the frequency response of the vibration sensing device in a relatively low frequency range (e.g., the middle and low frequency bands), making the frequency response curve of the vibration sensing device flatter in a relatively wide frequency range. Further, the introduction of the second resonant system makes the frequency response curve of the vibration sensing device have a new resonant peak at the third resonant frequency $f_2$, so that the frequency response curve 9130 of the vibration sensing device has three resonant peaks, further improving the sensitivity of the vibration sensing device makes the frequency response curve 9130 of the vibration sensing device have high sensitivity in a wide frequency range, and the frequency response curve 9130 is flat.

The description of the above-mentioned vibration sensing device 800 is for the purpose of illustration only, and is not intended to limit the scope of the present disclosure. Those skilled in the art may make various changes and modifications based on the description of the present disclosure. In some embodiments, the sizes of the second resonant frequency $f_1$ and the third resonant frequency $f_2$ may be set according to actual needs. For example, the second resonant frequency $f_1$ and the third resonant frequency may be smaller than the first resonant frequency $f_0$, so that the vibration sensing device 800 may have high sensitivity in the target frequency range (e.g., the middle and low frequency bands). For another example, the second resonant frequency $f_1$ and the third resonant frequency $f_2$ may be greater than the first resonant frequency $f_0$, so that the vibration sensing device 800 may have high sensitivity in the target frequency range (e.g., a higher frequency band). For another example, the second resonant frequency $f_1$ may be lower than the first resonant frequency $f_0$, and the third resonant frequency $f_2$ may be higher than the first resonant frequency $f_0$, so that the vibration sensing device 800 has high sensitivity in a wide frequency range and a flat frequency response curve. These changes and modifications are still within the protection scope of the present disclosure.

Figure 10:
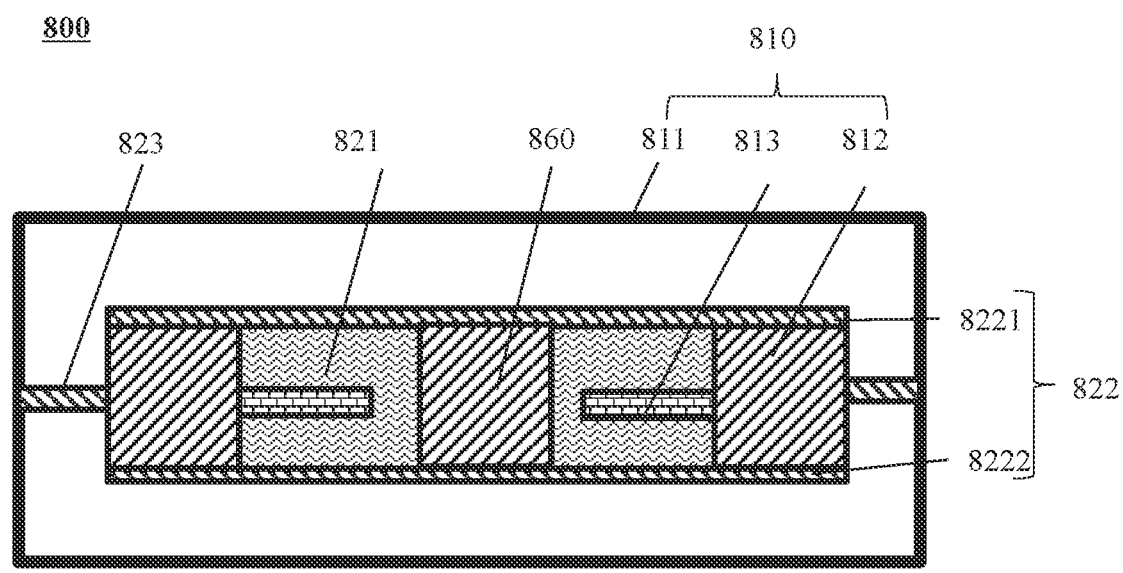
FIG. 10 is a cross-sectional view of an exemplary vibration sensing device according to some embodiments of the present disclosure.

FIG. 10 is a cross-sectional view of an exemplary vibration sensing device according to some embodiments of the present disclosure. As shown in FIG. 10, the vibration sensing device 800 may further include an adjustment element 860, and the adjustment element 860 may be disposed in the target cavity 821 for defining the size of the target cavity 821. In some embodiments, by setting the adjusting element 860, the contact area between the first plate body 8221 and/or the second plate body 8222 and the liquid in the target cavity 821 and the liquid quality in the target cavity 821 may be adjusted, and then the system stiffness and system quality of the first resonant system may be adjusted, so as to adjust the resonant frequency of the first resonant system. For example, when the length and height of the adjusting element 860 remain unchanged, the resonant frequency of the first resonant system may be reduced by reducing the width of the adjusting element 460, increasing the size of the target cavity 821 and/or the contact area between the plate body 822 and the target cavity 821, reducing the system stiffness, and/or increasing the system mass of the first resonant system.

In addition, the system quality of the second resonant system may also be adjusted by setting the adjusting element 860, so that the resonant frequency of the second resonant system may be adjusted. For example, by selecting the material of the vibration pickup element 823 (e.g., selecting a material with a larger elastic modulus), the volume of the adjusting element 860 may be reduced, the mass of the adjusting element 860 may be increased, and the resonant frequencies of the first resonant system and the second resonant system may be reduced, so that the vibration sensing device 800 has a higher sensitivity in a wider frequency range, and the sensitivity of the frequency response curve of the vibration sensing device 800 may be improved. For details of the adjusting element, please refer to FIGS. 4A to 4B and related descriptions.

FIG. 11 is a cross-sectional view of an exemplary vibration sensing device according to some embodiments of the present disclosure. The vibration sensing device 1100 may include a housing 1111, a vibration transmission element 1112, an acoustic-electric conversion element 1113, a plate body 1122, a vibration pickup element 1123, an adjusting element 1160, a first cavity 1121, a second cavity 1125, and a third cavity 1127. One or more elements in the vibration sensing device 1100 shown in FIG. 11 may be the same as or similar to one or more elements in the vibration sensing device 800 shown in FIG. 10. For example, the housing 1111, the vibration transmission element 1112, the acoustic-electric conversion element 1113, the vibration pickup element 1123, the third cavity 1127, etc., in the vibration sensing device 1100 may be the same or similar to the housing 811, the vibration transmission element 812, the acoustic-electric conversion element 813, the vibration pickup element 823, the third cavity 827, etc., in the vibration sensing device 800.

The difference between the vibration sensing device 1100 shown in FIG. 11 and the vibration sensing device 800 shown in FIG. 10 includes the type of the plate body 1122 (e.g., the first plate body 1124, the second plate body 1126, etc.), the location of the target cavity, and the setting of the support element 1160 in the vibration sensing device 1100. As shown in FIG. 11, the first plate body 1124 and/or the second plate body 1126 in the plate body 1122 of the vibration sensing device 1100 may include a rigid plate body with a Young's modulus of not less than 50 GPa. For example, the first plate body 1124 and the second plate body 1126 may be rigid plates. For another example, the first plate body 1124 may be a rigid plate, and the second plate body 1126 may be a flexible plate. For another example, the first plate body 1124 may be a flexible plate, and the second plate body 1126 may be a rigid plate.

The second cavity 1125 may be filled with liquid, that is, the second cavity 1125 may be a target cavity. The acoustic-electric conversion element 1113 may be disposed in the first cavity 1121. The first cavity 1121 and/or the third cavity 1127 may be vacuumed or filled with gas. In some embodiments, the vibration sensing device 1100 further includes a support element 1160, which may be arranged in the first cavity 1130, and may be configured to support the first plate body 1124 and the second plate body 1126. In some embodiments, one end of the support element 1160 may be connected to the first plate body 1124, and the other end may be connected to the second plate body 1126. In some embodiments, the supporting element 1160 may be in the shape of a cylinder, prism, trustum of a pyramid shape, etc. In some embodiments, the supporting element 1160 may include, but is not limited to, one or more of semiconductor materials, metal materials, metal alloys, organic materials, and the like. For the structural parameters of the support element 1160, the embodiments of the present disclosure do not make specific restrictions.

In some embodiments, the vibration pickup element 1123, the liquid filled in the second cavity 1125, the plate body 1122, the vibration transmission element 1112, the acoustic-electric conversion element 1113, and the support element 1160 may constitute a vibration component of the vibration sensing device. In some embodiments, the at least one vibration component may provide a first resonant system for the vibration sensing device 1100, wherein, the vibration pickup element 1123 may provide system stiffness for the first resonant system as a spring, and the liquid, the plate body 1122, the vibration transmission element 1112, the acoustic-electric conversion element 1113, and the support element 1160 filled in the second cavity 1125 may provide system mass for the first resonant system as a mass block. In some embodiments, the first resonant system may provide the vibration sensing device 1100 with a second resonant frequency.

The above description of the vibration sensing device 1100 is for illustration purposes only, and is not intended to limit the scope of the present disclosure. Those skilled in the art may make various changes and modifications based on the description of the present disclosure. In some embodiments, the first plate body 1124 and/or the second plate body 1126 in the plate body 1122 may be a flexible plate, and its Young's modulus may be 1 MPa~10 GPa. For illustration purposes, the first plate body 1124 may be taken as a flexible plate body for example. When the first plate body 1124 is a flexible plate, the vibration element may provide the vibration sensing device 1100 with the second resonant system and the above-mentioned first resonant system. The second resonant system may be composed of the first plate body 1124, the gas in the first cavity 1121, and the acoustic-electric conversion element 1113. The first plate body 1124 may be used as the spring of the first resonant system to provide system stiffness, and the gas filled in the first cavity 1121 may be used as the mass block of the first resonant system to provide system mass. In some embodiments, the second resonant system may provide the vibration sensing device 1100 with another second resonant frequency that is the same as or different from the above-mentioned second resonant frequency. These changes and modifications are still within the protection scope of the present disclosure.

FIG. 12 is a cross-sectional view of an exemplary vibration sensing device according to some embodiments of the present disclosure. As shown in FIG. 12, the vibration sensing device 1200 includes a housing 1211, a vibration transmission element, an acoustic-electric conversion element, a plate body 1222, a vibration pickup element 1223, and a supporting element 1260. The housing 1211, the vibration transmission element, and the vibration pickup element may be the same or similar to the housing 1111, the vibration transmission element, and the vibration pickup element 1123 in the vibration sensing device 1100 shown in FIG. 11. The support element 1260 of the vibration sensing device 1200 may be the same as or different from the support element 1160 in the vibration sensing device 1100. For example, the support element 1260 of the vibration sensing device 1200 may be configured to support the acoustic-electric conversion element, and the support element 1160 of the vibration sensing device 1100 may be configured to support the plate body 1122.

In some embodiments, the plate body 1222 may include a first plate body 1224 and a second plate body 1226. The first plate body 1224 and/or the second plate body 1226 may be flexible plates with Young's modulus ranging from 1 MPa to 10 GPa. In some embodiments, the first plate body 1224 and the second plate body 1226 may divide the space in the housing 1211 into multiple cavities, such as the first cavity 1221, the second cavity 1225, and the third cavity 1227. The first cavity 1221 may be defined and/or formed by the first plate body 1224, the second plate body 1226, and vibration transmission elements (e.g., the first vibration transmission element 1212-1 and the second vibration transmission element 1212-2); The second cavity 1225 may be defined and/or formed by the first plate body 1224, the vibration pickup element 1223 and at least a part of the housing 1211, and the second cavity 1225 contains liquid. The third cavity 1227 may be defined and/or formed by the second plate body 1226, the vibration pickup element 1223, and at least a portion of the housing 1211. In some embodiments, liquid may be contained in the third cavity 1227.

In some embodiments, the first cavity 1221 may be filled with one or more gases (e.g., air, oxygen, nitrogen, inert gases, etc.). In some embodiments, the support member 1260 may divide the first cavity 1221 into a cavity 1231 and a cavity 1232. In some embodiments, the cavity 1231 and the cavity 1232 may be the same cavity or independent cavities. The acoustic-electric conversion element may include a first acoustic-electric conversion element 1213-1 and a second acoustic-electric conversion element 1213-2. In some embodiments, the first acoustic-electric conversion element 1213-1 and the second acoustic-electric conversion element 1213-2 may have the same structure or may be mutually independent structures. The vibration transmission element may include a first vibration transmission element 1212-1 and a second vibration transmission element 1212-2. In some embodiments, the first vibration transmission element 1212-1 and the second vibration transmission element 1212-2 may be the same structure and may be mutually independent structures. For example, the first vibration transmission element 1212-1 and the second vibration transmission element 1212-2 may be integrally formed. For another example, the first vibration element 1212-1 and the second vibration element 1212-2 may be different parts of the same vibration element. For convenience of description, the cavity 1231 is taken as an example for illustration. In some embodiments, the first acoustic electrical conversion element 1213-1 may be set in the cavity 1231. For example, one end of the first acoustic electrical conversion element 1213-1 may be connected to the first vibration transmission element 1212-1, and the other end may be connected to the support element 1260, thus dividing the cavity 1233 into the first gas cavity 1233 and the second gas cavity 1235. In some embodiments, the first cavity 1225 may be filled with liquid, i.e. the first cavity 1225 may be the target cavity.

In some embodiments, the vibration pickup element 1223, the liquid filled in the second cavity 1225, the plate body 1222, the vibration transmission element, the acoustic-electric conversion element, and the support element 1260 may constitute the at least one vibration component of the vibration sensing device 1200. In some embodiments, the at least one vibration component may provide one or more resonant systems for the vibration sensing device 1200. One or more resonant systems may include a first resonant system and a second resonant system. Wherein, the vibration pickup element 1223 may be used as the spring of the first resonant system to provide the system stiffness, and the liquid filled in the second cavity 1225, the plate body 1122, the vibration transmission element, the acoustic-electric conversion element, and the support element 1260 may be used as the mass block of the first resonant system to provide the system mass. The second resonant system may include the plate body 1222, the gas in the cavity 1231, and the acoustic-electric conversion element 1213-1. When the vibration sensing device 1200 is configured to detect or pick up vibration, the housing 1211 may transmit the received vibration to the vibration transmission element through the vibration pickup element 1223 and/or the liquid in the second cavity 1225, and further transmit to the acoustic-electric conversion element, thus forming a first resonant system, which may provide the vibration sensing device 1200 with a second resonant frequency. At the same time, the vibration of the liquid in the second cavity 1225 may be transmitted to the plate body 1222 (e.g., the first plate body 1224), and the plate body 1222 may be deformed under the action of the vibration, thereby compressing the first gas cavity 1233 and/or the gas in the second gas cavity 1235 makes the acoustic-electric conversion element 1213-1 receive pressure (i.e. vibration signal) to output an electrical signal, thereby forming a second resonant system. In some embodiments, the second resonant system may provide another second resonant frequency for the vibration sensing device 1200. The plurality of second resonant frequencies may be the same or different. By introducing two resonant systems, the frequency response curve of the vibration sensing device 1200 may have multiple resonant peaks in a wide frequency range, thereby improving the vibration sensing device 1200 in a wide frequency range (e.g., a high frequency band). The sensitivity makes the frequency response curve of the vibration sensing device 1200 relatively flat.

FIG. 13 is a cross-sectional view of an exemplary vibration sensing device according to some embodiments of the present disclosure. As shown in FIG. 13, the vibration sensing device 1300 may include a housing 1311, a vibration transmission element 1312, an acoustic-electric conversion element 1313, a plate body 1322, a vibration pickup element 1323, a first cavity 1321, a second cavity 1325, a second cavity, a third cavity 1327, and support elements 1360.

One or more elements in the vibration sensing device 1300 shown in FIG. 13 may be the same as or similar to one or more elements in the vibration sensing device 1100 shown in FIG. 11. For example, the housing 1311, the vibration transmission element 1312, the acoustic-electric conversion element 1313, the plate body 1322, the vibration pickup element 1323, the first cavity 1321, the third cavity 1327, and the support element 1360, etc., in the vibration sensing device 1300 may be the same or similar with the housing 1111, the vibration transmission element 1112, the acoustic-electric conversion element 1113, the plate body 1122, the vibration pickup element 1123, the first cavity 1121, the third cavity 1127, and the support element 1160 in the vibration sensing device 100. The difference between the vibration sensing device 1300 shown in FIG. 13 and the vibration sensing device 1100 shown in FIG. 11 includes that the second cavity 1325 (that is, the target cavity of the vibration sensing device 1300) may include a liquid cavity 1325-1 and a gas cavity 1325-2. The liquid cavity 1325-1 may be configured to contain liquid and the gas cavity 1325-2 may be configured to contain gas.

In some embodiments, the first plate body 1324 and/or the second plate body 1326 in the plate body 1322 of the vibration sensing device 1300 may comprise a rigid plate, and a Young's modulus thereof may not be less than 50 GPa. For example, the first plate body 1324 and the second plate body 1326 may be rigid plates. For another example, the first plate body 1324 may be a rigid plate, and the second plate body 1326 may be a flexible plate. For another example, the first plate body 1324 may be a flexible plate, and the second plate body 1326 may be a rigid plate.

In some embodiments, when the plate body 1324 is a rigid plate, the vibration pickup element 1323, the liquid in the liquid cavity 1325-1, the plate body 1322, the vibration transmission element 1312, the acoustic-electric conversion element 1313, and the support element 1360 constitute the vibration sensing device 1300, which may provide the first resonant system for the vibration sensing device 1300. The vibration pickup element 1323 may provide the system stiffness for the vibration sensing device 1300 as the spring of the first resonant system. The liquid in the liquid cavity 1325-1, the plate body 1322, the vibration transmission element 1312, the acoustic-electric conversion element 1313, and the support element 1360 may be used as the mass block of the first resonant system to provide the system mass for it. In some embodiments, the first resonant system may provide the vibration sensing device 1300 with a second resonant frequency. In some embodiments, the system quality of the first resonant system may be adjusted or designed by adjusting or designing the size of the liquid cavity 1325-1 and/or the size of the gas cavity 1325-2, the quality of the liquid in the liquid cavity 1325-1, etc., so as to adjust or design the size of the second resonant frequency. For example, the greater the volume of the gas cavity 1325-2 is, the less the mass of the liquid in the liquid cavity 1325-1 is, and the less the system mass of the first resonant system is, and the greater the resonant frequency (i.e., the second resonant frequency) of the first resonant system is according to formula (1). For another example, the less the volume of the gas cavity 1325-2, the greater the mass of the liquid in the liquid cavity 1325-1, and the greater the system mass of the first resonant system. According to formula (1), the resonant frequency of the first resonant system is (i.e. the second resonant frequency) is smaller. In some embodiments, the volume of the liquid cavity 1325-1 or the gas cavity 1325-2 may be greater than 0 and less than the volume of the second cavity 1325.

In some embodiments, when the first plate body 1324 is a flexible plate, the at least one vibration component may provide one or more second resonant systems and the first resonant system described above for the vibration sensing device 1300. The second resonant system may be composed of the first plate body 1324, the gas in the first cavity 1321, the second plate body 1326, and the acoustic-electric conversion element 1313. The first plate body 1324 and the second plate body 1326 may provide system stiffness for the second resonant system as springs, and the gas filled in the first cavity 1321 may provide system mass for the second resonant system as a mass block. In some embodiments, the second resonant system may provide the vibration sensing device 1300 with another second resonant frequency that is the same as or different from the above-mentioned second resonant frequency.

The description of the vibration sensing device 1300 in FIG. 13 is for illustration purposes only, and is not intended to limit the scope of the present disclosure. Those skilled in the art may make various changes and modifications based on the description of this disclosure. For example, when the plates 1329-1, the first plate body 1324, and/or the second plate body 1326 between the liquid body cavity 1325-1 and the gas cavity 1325 are flexible plates, the plates 1329-1, the first plate body 1324, and/or the second plate body 1326 may provide system stiffness for them as springs of one or more second resonant systems. These changes and modifications are still within the protection scope of the present disclosure.

FIG. 14 is a cross-sectional view of an exemplary vibration sensing device according to some embodiments of the present disclosure.

As shown in FIG. 14, the third cavity 1327 of the vibration sensor 1300 may also be filled with liquid. For example, the third cavity 1327 may include a liquid cavity 1327-1 and a gas cavity 1327-2, wherein the liquid cavity 1327-1 may be configured to contain liquid and the gas cavity 1327-2 may be configured to contain gas. The target cavity of the vibration sensing device 1300 may include a second cavity 1325 and a third cavity 1327. The vibration pickup element 1323, the liquid in the liquid cavity 1325-1, the liquid in the liquid cavity 1327-1, the plate body 1322, the vibration transmission element 1312, the acoustic-electric conversion element 1313, and the support element 1360 of the vibration sensing device 1300 may provide a first resonant system for the vibration sensing device 1300. In some embodiments, the vibration pickup element 1323 may be used as the spring of the first resonant system to provide system stiffness, and the liquid in the liquid cavity 1325-1, the liquid in the liquid cavity 1327-1, the plate body 1322, the vibration transmission element 1312, the acoustic-electric conversion element 1313, and the support element 1360 may be used as the mass block of the first resonant system to provide system mass therefor.

In some embodiments, when the first plate body 1324 is a flexible plate, the vibration element may provide one or more second resonant systems and the first resonant system described above for the vibration sensing device 1300. The second resonant system may include a first plate body 1324, a gas in the first cavity 1321, a second plate body 1326, and an acoustic-electric conversion element 1313. The first plate body 1324 and the second plate body 1326 may serve as springs of the second resonant system to provide system stiffness, and the gas filled in the first cavity 1321 may serve as a mass of the second resonant system to provide system mass. In some embodiments, the second resonant system may provide the vibration sensing device 1300 with another second resonant frequency that is the same as or different from the above-mentioned second resonant frequency.

The description of the vibration sensing device 1300 in FIG. 14 is for illustration purposes only, and is not intended to limit the scope of the present disclosure. Those skilled in the art may make various changes and modifications based on the description of the present disclosure. For example, when the plate body 1329-1 between the liquid cavity 1325-1 and the gas cavity 1325, the plate body 1329-2 between the liquid cavity 1327-1 and the gas cavity 1327-2, the first plate body 1324 and/or the second plate body 1326 are flexible plates, the plate body 1329-1, the plate body 1329-2, the first plate body 1324 and/or the second plate body 1326 may provide the system stiffness as a spring of a plurality of second resonant systems. These changes and modifications are still within the protection scope of the present disclosure.

By setting liquid cavities in the second cavity 1325 and the third cavity 1327, the adjustable range of the system mass of the first resonant system may be expanded, so that the second resonant frequency may be introduced in a wide frequency range, and the sensitivity of the vibration sensing device 1300 in a wide frequency range may be improved. It should be noted that the size of the liquid cavity 1325-1 and gas cavity 1325-2 in the second cavity 1325 and/or the liquid cavity 1327-1 and gas cavity 1327-2 in the third cavity 1327 may be set according to actual needs. For example, the liquid cavity 1325-1 may be the same size as the second cavity 1325, that is, the liquid is filled into the entire second cavity 1325 (e.g., the second cavity 1125 in FIG. 11 and/or the second cavity 1225 in FIG. 12). For another example, the liquid body cavity 1327-1 in the third cavity 1327 may be the same size as the third cavity 1327, i.e., the liquid is filled into the third cavity 1327. For another example, the size of the gas cavity 1325-2 in the second cavity 1325 is equal to that of the second cavity 1325, and the size of the liquid cavity 1327-1 in the third cavity 1327 is equal to that of the third cavity 1327, that is, the gas is filled into the whole second cavity 1325, and the liquid is filled into the whole third cavity 1327. Variations and/or modifications such as these are still within the protection scope of the present disclosure.

Figure 15:
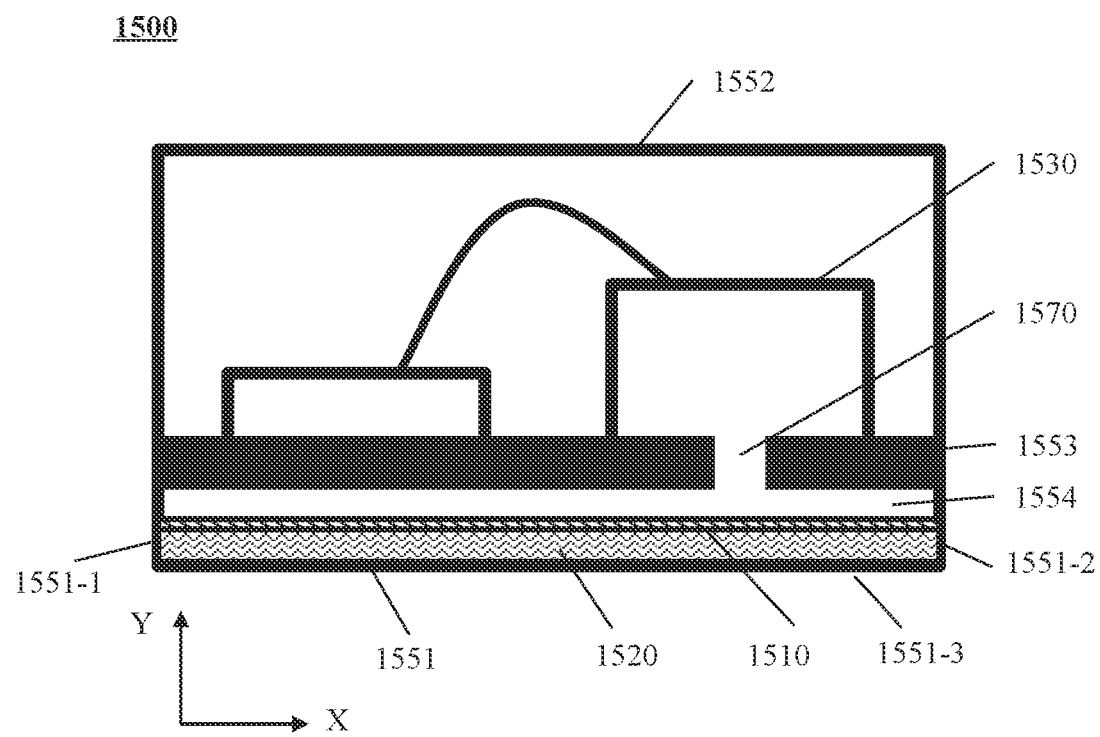
FIG. 15 is a cross-sectional view of an exemplary vibration sensing device according to some embodiments of the present disclosure.

FIG. 15 is a cross-sectional view of an exemplary vibration sensing device according to some embodiments of the present disclosure. As shown in FIG. 15, the vibration sensing device 1500 may include a first housing 1551, a vibration sensor, and a vibration component. In some embodiments, the vibration sensor may include a bone conduction vibration sensor, an air conduction vibration sensor, or a combination thereof. For the convenience of description, the vibration sensor shown in FIGS. 15 to 22 is described by taking an air conduction vibration sensor as an example.

Figure 21:
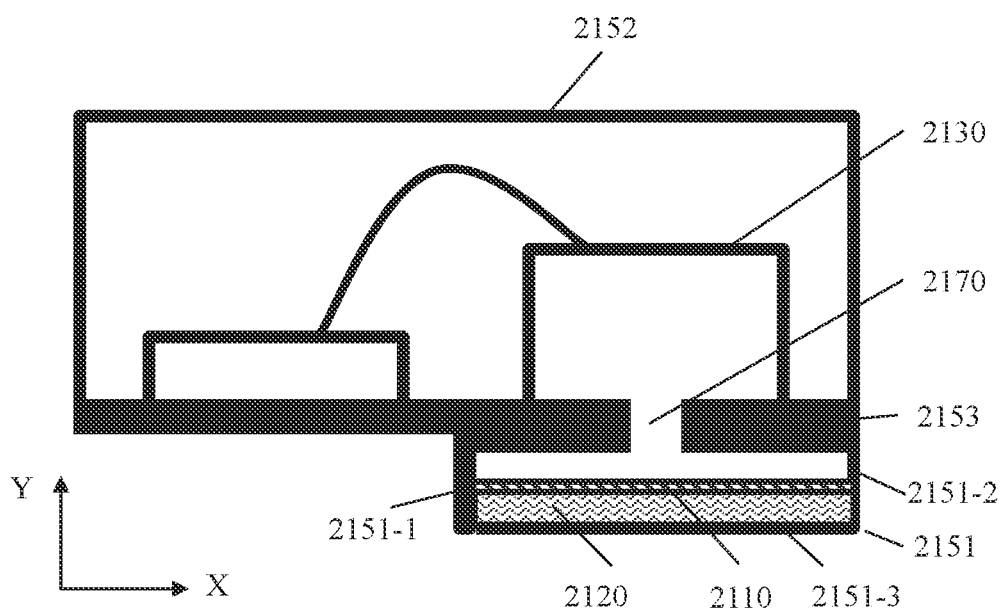
FIG. 21 is a cross-sectional view of an exemplary vibration sensing device according to some embodiments of the present disclosure.
Figure 22:
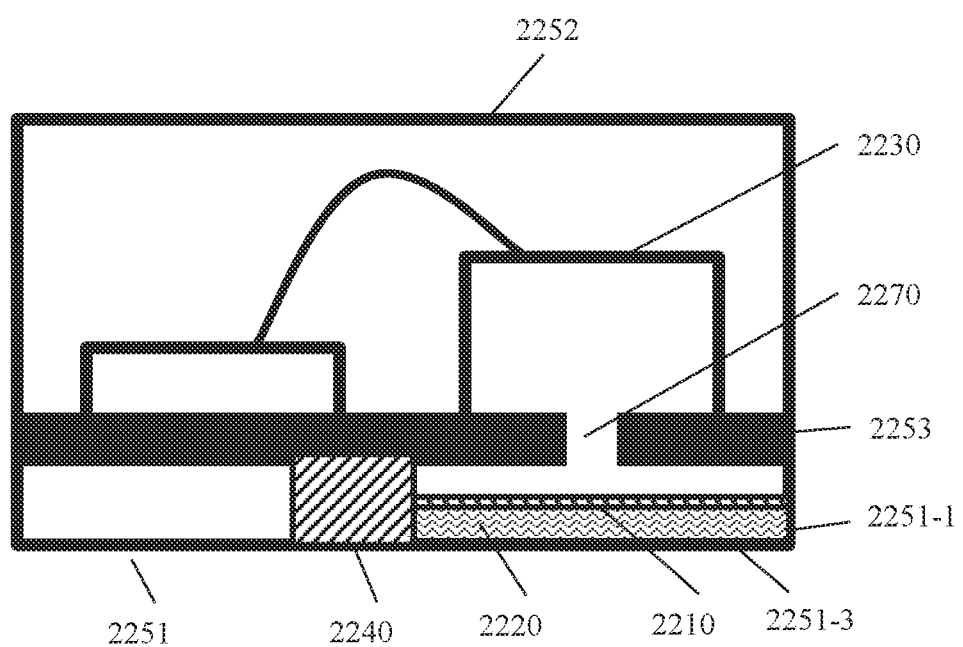
FIG. 22 is a cross-sectional view of an exemplary vibration sensing device according to some embodiments of the present disclosure.

In some embodiments, the first housing 1551 may be connected to the air conduction vibration sensor and the at least one vibration component respectively. For example, the air conduction vibration sensor may include a second housing 1552, and the first housing 1551 may be connected to at least a part of the second housing 1552 (e.g., the side wall 1553 of the second housing 1552). In some embodiments, the first housing 1551 and the second housing 1552 may be an integral structure or independent structures. For example, the first housing 1551 and the second housing 1552 may be integrally formed. For another example, the first housing 1551 and the second housing 1552 may be different parts of the same housing. For another example, the first housing 1551 and the second housing 1552 may be physically connected together by any suitable connection method (e.g., threaded connection, key connection, pin connection, interference connection, clamping, riveting, welding, bonding (or bonding), mortise and tenon connection, etc., or a combination thereof). In some embodiments, the length of the first housing 1551 (e.g., the length of the first housing 1551 along the X-axis direction) is equal to the length of the second housing 1552 in the same direction (as shown in FIGS. 15 to 20) or unequal (as shown in FIGS. 21 and 22).

In some embodiments, the first housing 1551 and at least a part of the vibration sensor (e.g., the side wall 1553 of the second housing 1552) form an accommodating space, and the accommodating space may be configured to accommodate the at least one vibration component. The at least one vibration component may include a plate body 1510 and a liquid filled in the target cavity 1520. The plate body 1510 may include a vibration plate body (also referred to as a flexible plate). The target cavity 1520 may be defined by the plate body 1510 and at least a part of the first case 1551 (e.g., the side wall 1551-1, the side wall 1551-2, and the bottom wall 1551-3 of the first case). The plate body 1510 may be disposed in a space within the first housing 1551. The plate body 1510 may be physically connected to the first housing 1551 respectively. For example, both ends of the plate body 1510 may be physically connected to the side walls 1551-1 and 1551-2 of the first housing 1551, respectively. In some embodiments, the first side wall 1551-1 and the second side wall 1551-22 may be an integral structure or independent structures. For example, the first side wall 1551-1 and the second side wall 1551-22 may be integrally formed. For another example, the first side wall 1551-1 and the second side wall 1551-22 may be different parts of the same side wall of the housing. For another example, the first side wall 1551-1 and the second side wall 1551-22 may be connected by any suitable connection (e.g., a screw connection, a key connection, a pin connection, an interference connection, a clamping, a riveting, a welding, an adhesive bonding (or bonding)), mortise (or mortise and tenon connection), etc., or a combination thereof) are physically connected together. The plate body 1510 and at least a part of the first housing 1551 and at least a part of the second housing 1552 (e.g., the sound inlet hole 1570 and the side wall 1553) may form a second cavity 1554. The second cavity 1554 may be filled with fillers such as solids, gases, or a combination thereof.

In some embodiments, the second housing 1552 may be provided with a sound inlet hole 1570 of the acoustic-electric conversion element 1530. In some embodiments, the size and shape of the sound inlet hole 1570 may be set according to actual needs. The shape of the sound inlet hole 1570 may include regular structures such as cuboids, cylinders, prisms, and truncated cones, or other irregular structures. The at least one vibration component may be acoustically connected to the acoustic-electric conversion element 1530 through the sound inlet hole 1570. The acoustic connection between the at least one vibration component and the acoustic-electric conversion element means that a vibration signal (e.g., a sound signal) may be transmitted from the at least one vibration component to the acoustic-electric conversion element through the sound inlet hole. For example, the vibration of the at least one vibration component may pass through the second cavity 1554 and the sound inlet hole 1570, for example, by vibration the filler in the second cavity 1554 and the air in the sound inlet hole 1570, and transmit the vibration to the acoustic-electric conversion element 1530.

In some embodiments, the first housing 1551 may receive a vibration signal external to the vibration sensing device 1500 to generate vibration. The vibration generated by the first housing 1551 may be transmitted to the plate body 1510 through the liquid in the target cavity 1520, thereby causing the vibration of the plate body 1510. In some embodiments, the vibration of the at least one vibration component may form one or more resonant systems that provide the vibration sensing device 1500 with a second resonant frequency. Further, the vibration of the plate body 1510 may be transmitted to the acoustic-electric conversion element 1530 through the filler (e.g., air) in the second cavity 1554 and the sound inlet hole 1570. For example, the vibration of the plate body 1510 may cause the air in the second cavity 1554 to vibrate, and the air vibration is transmitted to the acoustic-electric conversion element 1530 through the sound inlet hole 1570. The acoustic-electric conversion element 1530 may change corresponding parameters (e.g., capacitance, charge, acceleration, light intensity, frequency response, etc., or a combination thereof) according to the received vibration, and the changed parameters may be detected by electrical methods and output with vibration the corresponding electrical signal. In some embodiments, the air conduction vibration sensor (e.g., the acoustic-electric conversion element 1530 in the air conduction vibration sensor) may have a first resonant frequency. In some embodiments, the first resonant frequency may be different than the second resonant frequency. By setting a vibration component in the vibration sensing device 1500, a second resonant frequency may be introduced on the basis of the first resonant frequency of the gas conductivity sensor, thereby improving the sensitivity of the vibration sensing device 1500, stabilizing the frequency response of the vibration sensing device 1500 within the required frequency band, and simultaneously filling the target cavity 1520 with liquid may also improve the anti-impact performance of the vibration sensing device 1500. In some embodiments, the size of the second resonant frequency may be adjusted or set by adjusting or setting the structural parameters of the at least one vibration component. The structural parameters of the at least one vibration component may include the type of the plate, the position of the plate, the size of the plate, the elastic coefficient of the plate, the type of liquid, the density of the liquid, the viscosity of the liquid, the size of the target cavity, etc. or a combination thereof. For details on adjusting the second resonant frequency by changing the structural parameters of the at least one vibration component, see FIGS. 16 to 22 and its related description.

Figure 16:
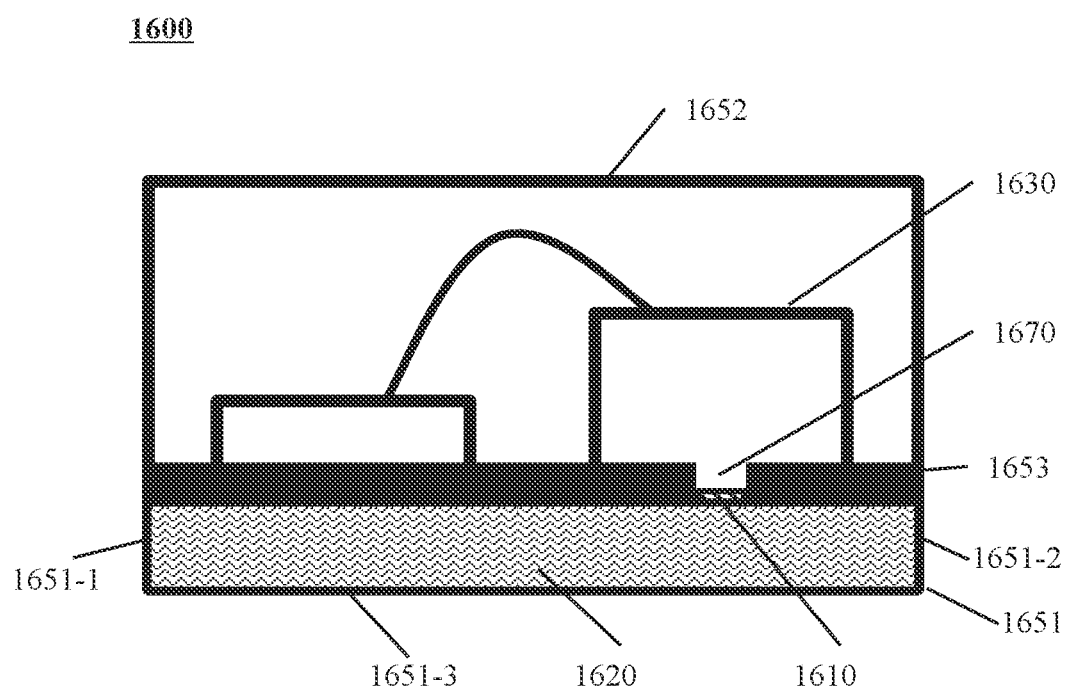
FIG. 16 is a cross-sectional view of an exemplary vibration sensing device according to some embodiments of the present disclosure.

FIG. 16 is a cross-sectional view of an exemplary vibration sensing device according to some embodiments of the present disclosure. As shown in FIG. 16, the vibration sensing device 1600 may include a first housing 1651, an air conduction vibration sensor, a vibration component, and a target cavity 1620. The air conduction vibration sensor may include a second housing 1652 and an acoustic-electric conversion element 1630. The acoustic-electric conversion element 1630 may include a sound inlet hole 1670. The at least one vibration component may include a plate body 1610 and a liquid filled in the target cavity 1620. One or more elements in the vibration sensing device 1600 may be the same as or similar to one or more elements in the vibration sensing device 1500 shown in FIG. 15. For example, the first housing 1651, the second housing 1652, and the acoustic-electric conversion element 1630 in the vibration sensing device 1600 may be the same or similar to the first housing 1551, the second housing 1552, and the acoustic-electric conversion element 1530 in the vibration sensing device 1500.

The difference between the vibration sensing device 1600 shown in FIG. 16 and the vibration sensing device 1500 shown in FIG. 15 includes that the plate body 1610 (e.g., the vibration plate body) of the at least one vibration component 1600 may be arranged in the sound inlet hole 1670 of the acoustic-electric conversion element 1163. Both ends of the plate body 1610 may be physically connected to the second housing 1652 (e.g., the side wall of the sound inlet hole 1670). The plate body 1610 and at least a part of the second housing 1652 (e.g., the side wall 1653 of the second housing 1652) and the first housing 1651 (e.g., the side wall 1651-1 of the first housing 1651, the side wall 1651-2 and bottom wall 1651-3) may define a target cavity. A liquid (e.g., water, oil, etc., or a combination thereof) may be filled in the target cavity 1620. In some embodiments, the side walls 1651-1, side walls 1651-2, and/or bottom walls 1651-3 of the housing 1651 may be an integral structure or a mutually independent structure. For example, side walls 1651-1, side walls 1651-2, and/or bottom walls 1651-3 may be integrally molded. For another example, side walls 1651-1, side walls 1651-2, and/or bottom walls 1651-3 may be different parts of the same side wall of the housing 1651. For another example, side walls 1651-1, side walls 1651-2, and/or bottom walls 1651-3 may be physically connected together by any suitable connection method (e.g., threaded connection, key connection, pin connection, interference connection, clamping, riveting, welding, adhesive (or bonding), mortise (or mortise and tenon connection), or a combination thereof).

In some embodiments, the vibrations generated by the first housing 1651 may be transmitted to the plate body 1610 through the liquid in the target cavity 1620, thereby causing the plate body 1610 to vibrate. In some embodiments, the at least one vibration component may form one or more resonant systems that provide the vibration sensing device 1600 with a second resonant frequency. Further, the vibration of the plate body 1610 may be transmitted to the acoustic-electric conversion element 1630 through the sound inlet hole 1670. For example, the vibration of the plate body 1610 may cause the air vibration in the sound inlet hole 1670, which may be transferred to the acoustic-electric conversion element 1630. The acoustic-electric conversion element 1630 may generate a corresponding electrical signal according to the received vibration.

Compared with the vibration sensing device 1500 in FIG. 15, the size of the plate body 1610 of the vibration sensing device 1600 shown in FIG. 16 is relatively small, and the volume of liquid in the target cavity 1620 is relatively large. Under the same other conditions (e.g., plate body material or elastic modulus, liquid density, type, etc.), the resonant system formed by the at least one vibration component in the vibration sensing device 1600 has a relatively large system stiffness and a relatively large system mass. Therefore, the second resonant frequency of the sensing device 1600 may be greater than, equal to, or less than the second resonant frequency of the sensing device 1500, and depends on the ratio of system stiffness to system mass. Therefore, the desired or ideal resonant frequency may be obtained by adjusting the size and/or position of the plate body 1610 and the mass of the liquid in the target cavity 1620, and adjusting the size of the second resonant frequency provided by the at least one vibration component to the vibration sensing device 1600, so that the sensitivity of the vibration sensing device 1600 may be improved in different frequency ranges.

Figure 17:
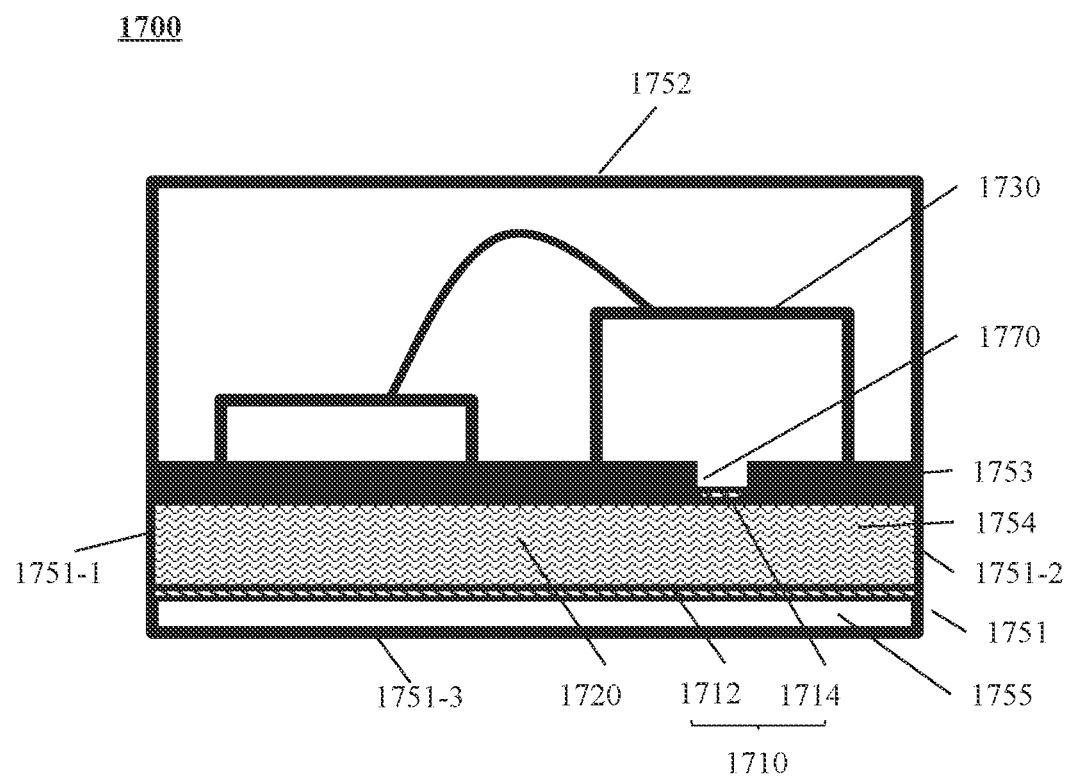
FIG. 17 is a cross-sectional view of an exemplary vibration sensing device according to some embodiments of the present disclosure.

FIG. 17 is a cross-sectional view of an exemplary vibration sensing device according to some embodiments of the present disclosure. As shown in FIG. 17, the vibration sensing device 1700 may include a first housing 1751, an air conduction vibration sensor, a vibration component, and a target cavity 1720. The air conduction vibration sensor may include a second housing 1752 and an acoustic-electric conversion element 1730. The acoustic-electric conversion element 1730 may include an acoustic inlet hole 1770. The at least one vibration component may include a plate body 1710 and a liquid filled in the target cavity 1720. One or more elements in the vibration sensing device 1700 may be the same as or similar to one or more elements in the vibration sensing device 1600 shown in FIG. 16. For example, the first housing 1651, the second housing 1752, and the acoustic-electric conversion element 1730 in the vibration sensing device 1700 may be connected to the first housing 1651, the second housing 1652, the acoustic-electrical conversion element 1630 and the like are the same or similar.

The difference between the vibration sensing device 1700 shown in FIG. 17 and the vibration sensing device 1600 shown in FIG. 16 includes that the plate body 1710 of the vibration sensing device 1700 may include a first plate body 1712 and a second plate body 1714. The second plate body 1714 may be disposed in the sound inlet hole 1770 of the acoustic-electric conversion element 1730. As shown in FIG. 17, the second plate body 1714 may be physically connected to the second housing 1752 (e.g., the side wall 1753 of the second housing 1752). Exemplary connection methods may include screw connection, key connection, pin connection, interference connection, clamping connection, riveting, welding, gluing (or bonding), mortise and tenon connection (or mortise and tenon connection), etc., or combinations thereof. The first plate body 1712, the second plate body 1714, at least a portion of the second housing 1752 (e.g., the side walls 1753 of the second housing 1752) and at least a portion of the first housing 1751 (e.g., the side walls 1751-1 and 1751-2 of the first housing 1751) may define and/or form a target cavity 1720. The first plate body 1712 and at least part of the first housing 1751 (e.g., the side walls 1751-1, side walls 1751-2, and bottom walls 1751-3 of the first housing 1751) may define and/or form a cavity 1755, which may be vacuumed or contain gas.

In some embodiments, the liquid in the first plate body 1712, the second plate body 1714, and the target cavity 1720 may form a vibration component of the vibration sensing device 1700, and the at least one vibration component may form a resonant system to provide a second resonant frequency for the vibration sensing device 1700. The second plate body 1714 and the first plate body 1712 (or the gas filled in the first plate body 1712 and the cavity 1755) may provide the system stiffness for the resonant system, and the liquid filled in the target cavity 1720 may provide the system mass for the resonant system. In some embodiments, the vibration generated by the first housing 1751 may be transmitted to the plate body 1710, thereby causing the vibration of the plate body 1710. The vibration of the plate body 1710 (e.g., the second plate body 1714) may be transmitted to the acoustic-electric conversion element 1730 through the sound inlet hole 1770. The acoustic-electric conversion element 1730 may generate a corresponding electrical signal according to the received vibration.

Compared with the resonant system formed by the at least one vibration component of the vibration sensing device 1600 shown in FIG. 16, the vibration sensing device 1700 has a first plate body 1712. Under the same condition, the resonant system formed by the at least one vibration component of the vibration sensor 1700 has a relatively small system stiffness. The liquid in the target cavity 1720 of the vibration sensing device 1700 may provide less system mass for the at least one vibration component than the liquid in the target cavity 1620 of the vibration sensing device 1600 provides for the at least one vibration component. The second resonant frequency of the vibration sensing device 1700 may be greater than, lower than or equal to the second resonant frequency of the vibration sensing device 1600, which depends on the ratio of the system stiffness to the system mass. The second resonant frequency of 1700 may also be set and/or adjusted by setting and/or adjusting the structural parameters of one or more elements in the at least one vibration component (e.g., the first plate body 1712, the second plate body 1714, the target cavity 1720, etc.), thereby improving the sensitivity of the vibration sensing device 1700.

Figure 18:
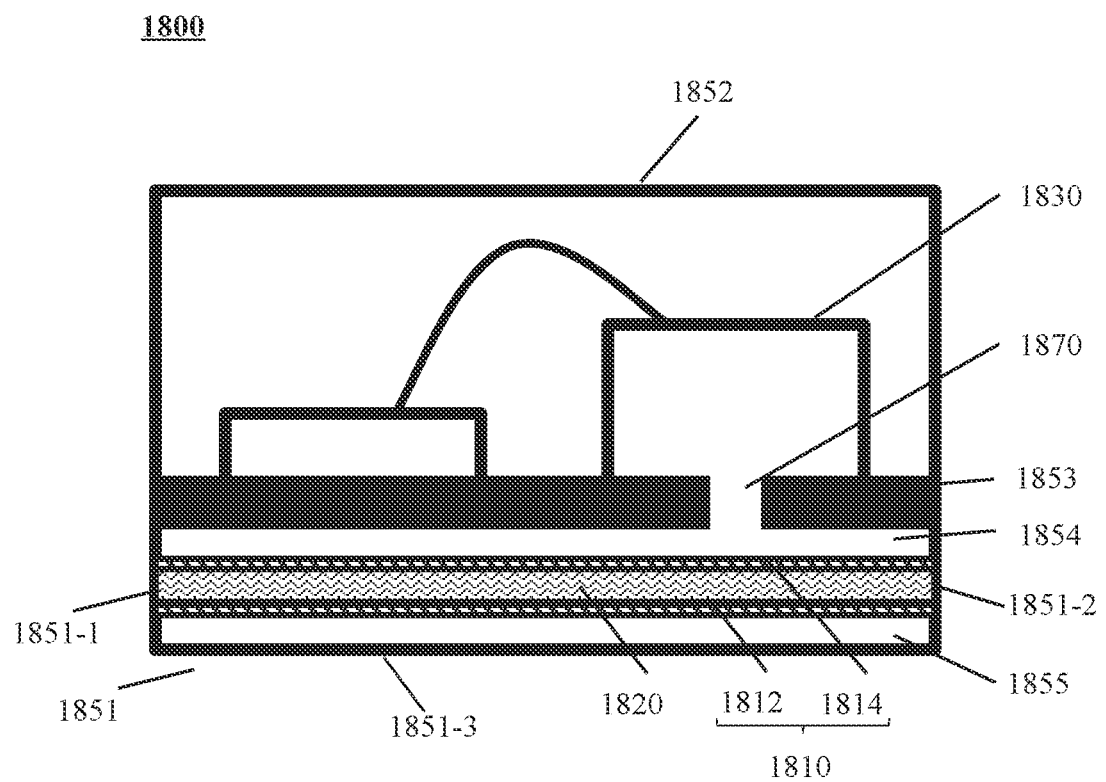
FIG. 18 is a cross-sectional view of an exemplary vibration sensing device according to some embodiments of the present disclosure.

FIG. 18 is a cross-sectional view of an exemplary vibration sensing device according to some embodiments of the present disclosure. As shown in FIG. 18, the vibration sensing device 1800 may include a first housing 1851, an air conduction vibration sensor, a vibration component, and a target cavity 1820. The air conduction vibration sensor may include a second housing 1852, an acoustic-electric conversion element 1830, and an acoustic hole 1870. The at least one vibration component may include a plate body 1810 and a liquid filled in the target cavity 1820. One or more elements in the vibration sensing device 1800 may be the same as or similar to one or more elements in the vibration sensing device 1500 shown in FIG. 15. For example, the first housing 1851, the second housing 1852, and the acoustic-electric conversion element 1830 in the vibration sensing device 1800 may be connected to the first housing 1551, the second housing 1552, the acoustic-electrical conversion element 1530 are the same or similar.

The difference between the vibration sensing device 1800 shown in FIG. 18 and the vibration sensing device 1500 shown in FIG. 15 is that the plate body 1810 in the at least one vibration component of the vibration sensing device 1800 may include a first plate body 1812 and a second plate body 1814. The first plate body 1812 and the second plate body 1814 may be physically connected to the first housing 1851. For example, both ends of the first plate body 1812 and/or the second plate body 1814 may be physically connected to the first housing 1851 (e.g., the side walls 1851-1 and 1851-2 of the first housing 1851), respectively. At least a portion of the second plate body 1814 and the second housing 1852 and at least a portion of the first housing 1851 (e.g., side walls 1851-2 and 1851-2 of the first housing 1851) define and/or form a cavity 1854. The first plate body 1812, the second plate body 1814, and part of the first housing 1851 (e.g., the side walls 1851-2 and 1851-2 of the first housing 1851) define and/or form a target cavity 1820. The first plate body 1812 and at least a portion of the first housing 1851 (e.g., side walls 1851-2, side walls 1851-2, and bottom walls 1851-3 of the first housing 1851) define and/or form a cavity 1855. In some embodiments, target cavity 1820 is filled with a liquid. The cavity 1854 and/or cavity 1855 may be vacuumed or filled with one or more gases (e.g., air, oxygen, nitrogen, inert gas, etc.).

In some embodiments, the liquid in the first plate body 1812, the second plate body 1814, and the target cavity 1820 may constitute a vibration component of the vibration sensing device 1800. The at least one vibration component may form a resonant system to provide a second resonant frequency to the vibration sensing device 1800. The first plate body 1812 (or the gas filled in the first plate body 1812 and the cavity 1855) and the second plate body 1814 (or the gas filled in the second plate body 1814 and the cavity 1854) may be used as the spring of the resonant system to provide system stiffness for the resonant system, and the liquid filled in the target cavity 1820 may be used as the mass block of the resonant system to provide system mass for the resonant system.

In some embodiments, the vibrations generated by the first housing 1851 may be transmitted to the plate body 1810, and the vibration of the plate body 1810 (e.g., the second plate body 1814) may pass through the cavity 1854 and the sound inlet hole 1870, for example, by making The air in the second cavity 1854 and the air in the sound inlet hole 1870 vibrate, and transmit the vibration to the acoustic-electric conversion element 1830. The acoustic-electric conversion element 1830 may generate corresponding electrical signals according to the received vibration. The system stiffness of the resonant system formed by the at least one vibration component may be changed by setting different counts of plates (e.g., one plate body shown in FIG. 15 or FIG. 16, and two plates shown in FIG. 18), and the system mass of the resonant system formed by the at least one vibration component may be changed by changing and/or setting the mass of the liquid in the target cavity, thus the second resonant frequency of the vibration sensing device may be adjusted and/or set, thus, the resonant frequency of the vibration sensing device may be adjusted according to the actual needs, and the sensitivity of the vibration sensing device may be improved in different frequency ranges.

Figure 19:
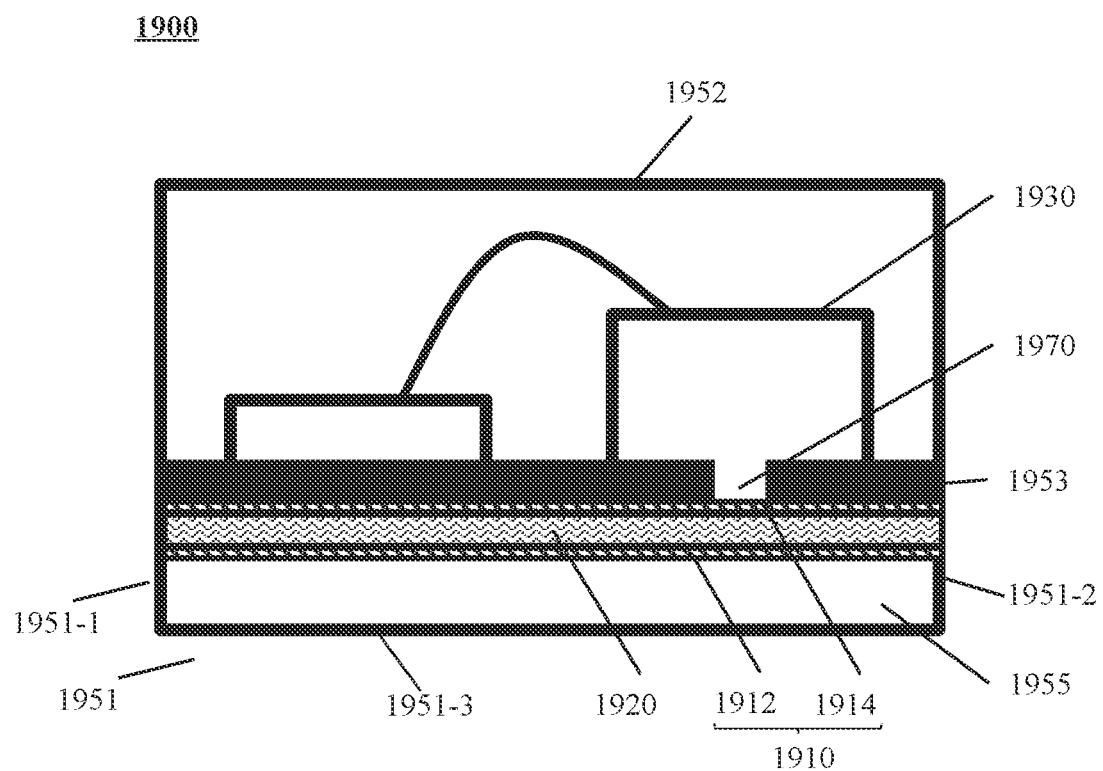
FIG. 19 is a cross-sectional view of an exemplary vibration sensing device according to some embodiments of the present disclosure.

FIG. 19 is a cross-sectional view of an exemplary vibration sensing device according to some embodiments of the present disclosure. As shown in FIG. 19, the vibration sensing device 1900 may include a first housing 1851, an air conduction vibration sensor, a vibration component, and a target cavity 1920. The air conduction vibration sensor may include a second housing 1952 and an acoustic-electric conversion element 1930. The acoustic-electric conversion element 1930 may include an acoustic inlet hole 1970. The plate body 1910 may include a first plate body 1912 and a second plate body 1914.

One or more elements of the vibration sensing device 1900 may be the same as or similar to one or more elements of the vibration sensing device 1800 shown in FIG. 18. For example, the first housing 1951, the second housing 1952, and the acoustic-electric conversion element 1930 in the vibration sensing device 1900 may be the same or similar to the first housing 1851, the second housing 1852, and the acoustic-electric conversion element 1830 in the vibration sensing device 1800.

The difference between the vibration sensing device 1900 shown in FIG. 19 and the vibration sensing device 1800 shown in FIG. 18 is that the second plate body 1914 in the vibration plate body 1910 is connected or adjacent to at least a part of the second housing 1952 (e.g., the side wall 1953 of the second housing 1952).

The first plate body 1912, the second plate body 1914, and at least part of the first housing 1951 (e.g., the side walls 1951-2 and 1951-2 of the first housing 1951) define and/or form the target cavity 1920. The target cavity 1920 may be filled with a liquid. The first plate body 1912 and at least a portion of the first housing 1951 (e.g., the side walls 1951-2, the side walls 1951-2, and the bottom walls 1951-3 of the first housing 1951) define and/or form a cavity 1955. The cavity 1955 may be vacuumed or filled with gas. In some embodiments, the at least one vibration component of the vibration sensing device 1900 may be composed of at least a part of the second plate body 1914 (e.g., the part of the second plate body 1914 that is acoustically connected to the sound inlet hole 1970), the first plate body 1912, and the liquid in the target cavity 1920. The at least one vibration component may form a resonant system to provide the vibration sensing device 1900 with a second resonant frequency. At least a part of the second plate body 1914 and the first plate body 1912 (or the gas filled in the first plate body 1912 and the cavity 1955) may act as springs of the resonant system to provide system stiffness for the resonant system. The liquid filled in the target cavity 1920 may be used as the mass block of the resonant system to provide the system mass for the resonant system. In some embodiments, the vibrations generated by the first housing 1951 may be transmitted to the plate body 1910, and the vibration of the plate body 1910 (e.g., at least part of the second plate body 1914) may be transmitted to the acoustic-electric conversion element 1930 through the sound inlet hole 1970 of the acoustic-electric conversion element 1930. The acoustic-electric conversion element 1930 may generate corresponding electrical signals according to the received vibration.

Compared with the at least one vibration component of the vibration sensing device 1800 shown in FIG. 18, due to the effect of the side wall 1953 of the second housing 1952, the size of the second plate body 1914 shown in FIG. 19 is smaller than the size of the second plate body 1814 shown in FIG. 18. Accordingly, the system stiffness provided for the at least one vibration component by the second plate body 1914 of the vibration sensing device 1900 in FIG. 19 is greater than that provided for the at least one vibration component by the second plate body 1914 of the vibration sensing device 1800 in FIG. 18. The second resonant frequency is provided by the at least one vibration component in FIG. 19 for the vibration sensing device 1900 may be greater than the second resonant frequency provided by the at least one vibration component in FIG. 18 for the vibration sensing device 1800. The second resonant frequency of the vibration sensing device may be defined and/or adjusted by setting and/or adjusting the structural parameters of one or more elements in the at least one vibration component (e.g., the size and/or position of the first plate body 1912, the size and/or position of the second plate body 1914, etc.) to obtain the desired or ideal second resonant frequency of the vibration sensing device 1900, thereby improving the sensitivity of the vibration sensing device 1900 in a frequency range including a desired or ideal second resonant frequency.

Figure 20:
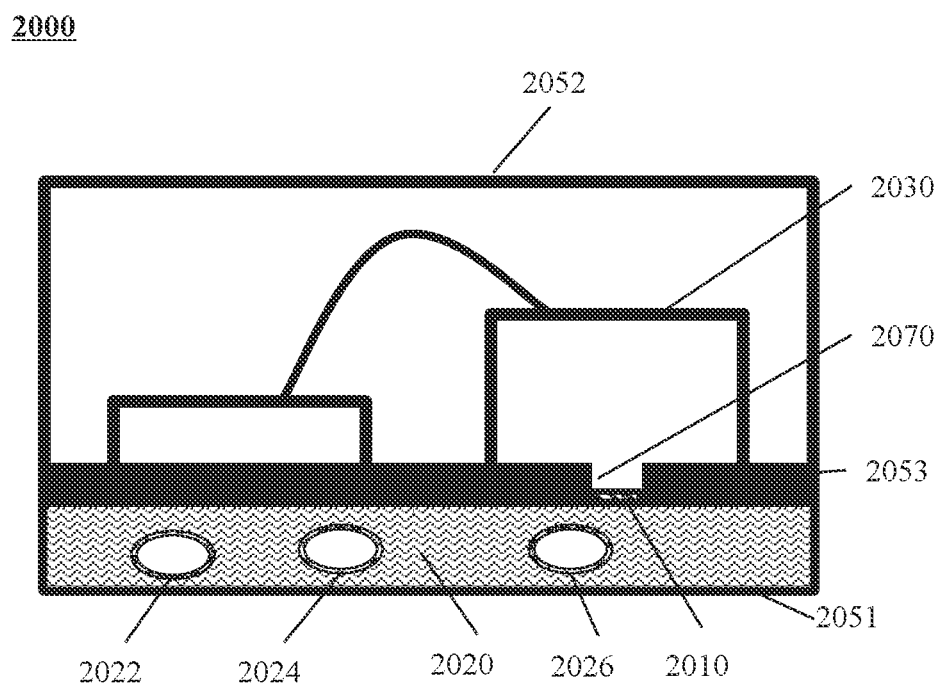
FIG. 20 is a cross-sectional view of an exemplary vibration sensing device according to some embodiments of the present disclosure.

FIG. 20 is a cross-sectional view of an exemplary vibration sensing device according to some embodiments of the present disclosure. As shown in FIG. 20, the vibration sensing device 2000 may include a first housing 2051, an air conduction vibration sensor, a vibration component, and a target cavity 2020. The air conduction vibration sensor may include a second housing 2052, an acoustic-electric conversion element 2030, and an acoustic inlet hole 2070. The plate body 2010 and the liquid filled in the target cavity 2020 may constitute a vibration component of the vibration sensing device 2000. One or more elements in the vibration sensing device 2000 may be the same as or similar to one or more elements in the vibration sensing device 1600 shown in FIG. 16. For example, the first housing 2051, the second housing 2052, the acoustic-electric conversion element 2030, the target cavity 2020, etc., in the vibration sensing device 2000 may be respectively connected to the first housing 1651, the second housing 1652, the acoustic-electric conversion element 1630, the target cavity 1620, etc., are the same or similar.

The difference between the vibration sensing device 2000 shown in FIG. 20 and the vibration sensing device 1600 shown in FIG. 20 may include that the target cavity 2020 may include one or more sub-cavities (e.g., a sub-cavity 2022, a sub-cavity 2024, and a sub-cavity 2026) defined by an elastic membrane.

In some embodiments, the elastic membrane, the sub-cavity that the elastic membrane defines, and the filling contained in the sub-cavity may be regarded as an elastic whole, which may be deformed when it is under pressure. For example, the vibration signal transmitted by the liquid may compress the elastic whole, resulting in elastic deformation and/or displacement of the membrane, the sub-cavities, and the filling contained within the sub-cavities. The liquid filled by the plate body 2010, the sub-cavity and its filler, and the target cavity 2020 may form a vibration component to provide a second resonant system for the vibration sensing device 2000. The plate body 2010, the sub-cavity and the filler thereof may be used as the spring of the resonant system to provide the system stiffness for the resonant system, and the liquid filled in the target cavity 2020 may be used as the mass block of the resonant system to provide the system mass for the resonant system.

Compared with the vibration sensing device 1600 filled with liquid, the vibration sensing device 2000 filled with liquid and sub-cavity may have excessive stiffness and damping, which may affect the sensitivity of the sensing device 1600, because the liquid in the target cavity 1620 of the sensing device 1600 is incompressible. Since the sub-cavity in the target cavity of the vibration sensing device 2000 is compressible and has small stiffness, the equivalent stiffness of the liquid and the sub-cavity is small. The second resonant frequency of the vibration sensing device 2000 may be lower than the second resonant frequency of the vibration sensing device 1600. By setting a sub-cavity in the target cavity, the frequency response of the vibration sensing device 2000 may be effectively controlled, thus improving the overall sensitivity of the vibration sensing device 2000. The frequency response curve is relatively flat, and the effective bandwidth (meeting the flat frequency response condition) may cover a large range. In some embodiments, by adjusting the ratio of the volume of the sub-cavity to the volume of the liquid in the vibration sensing device 2000, the position of the second resonant frequency of the vibration sensing device 2000 may be adjusted and/or set, so as to optimize the frequency response curve of the vibration sensing device 2000 is relatively flat. For details about the sub-cavity, reference may be made to FIG. 5 and its related descriptions.

FIG. 21 is a cross-sectional view of an exemplary vibration sensing device according to some embodiments of the present disclosure. As shown in FIG. 21, the vibration sensing device 2100 may include a first housing 2151, an air conduction vibration sensor, a vibration component, and a target cavity 2120. The air conduction vibration sensor may include a second housing 2152 and an acoustic-electric conversion element 2130. The acoustic-electric conversion element 2130 may include an acoustic inlet hole 2170. The sound inlet hole 2170 may be arranged on the second housing 2152 (e.g., the side wall 2153 of the second housing 2152). One or more elements of the vibration sensing device 2100 may be the same or similar to one or more elements of the vibration sensing device 1500 shown in FIG. 15. For example, the first housing 2151, the second housing 2152, and the acoustic-electric conversion element 2130 in the vibration sensing device 2100 may be the same or similar to the first housing 1551, the second housing 1552, and the acoustic-electric conversion element 1530 in the vibration sensing device 1500.

The difference between the vibration sensing device 2100 shown in FIG. 21 and the vibration sensing device 1500 shown in FIG. 15 is that the size of the target cavity 2120 of the vibration sensing device 2100, such as the size along the X axis, is smaller than the size along the X axis of the target cavity 1520 of the vibration sensing device 1500.

As shown in FIG. 21, the target cavity 2120 of the vibration sensing device 2100 is defined and/or formed by the plate body 2110 and at least a portion of the first housing 2151 (e.g., the side walls 2151-1, 2151-2, and 2151-3 of the first housing 2151). The plate body 2110 may include a vibration plate body (also referred to as a flexible plate), and at least a portion of the plate body 2110 may be physically connected to the first housing 2151. For example, both ends of the plate body 2110 may be physically connected to the side walls 2151-1 and 2151-2 of the first housing 2151, respectively. The at least one vibration component of the vibration sensing device 2100 may include a liquid filled in the plate body 2110 and the target cavity 2120. In some embodiments, the liquid in the plate body 2110 and the target cavity 2120 may constitute a vibration component of the vibration sensing device 2100. In some embodiments, the at least one vibration component may form one or more resonant systems to provide a second resonant frequency for the vibration sensing device 2100. In some embodiments, the length of the first housing 2151 along the X axis direction may be less than the length of the second housing 2152 along the X axis direction, and the first housing 2151 may be connected to a part of the air conduction vibration sensor (e.g., a part of the side wall 2153 of the second housing 2152). Since the size of the plate body 2110 of the vibration sensing device 2100 is smaller than that of the plate body 1510 of the vibration sensing device 1500, under the same other conditions, the system stiffness provided by the plate body 2110 of the vibration sensing device 2100 for the at least one vibration component is greater than that provided by the plate body 1510 of the vibration sensing device 1500 for the at least one vibration component. The system mass provided by the liquid in the target cavity 2120 of the vibration sensing device 2100 for the resonant system may be less than the mass provided by the liquid in the target cavity 1520 of the vibration sensing device 1500 for the at least one vibration component. The second resonant frequency of the vibration sensing device 2100 may be greater than the second resonant frequency of the vibration sensing device 1500. By adjusting the length of the first housing 2151 along the X-axis direction, the system stiffness and system quality of the resonant system provided by the at least one vibration component may be reduced, so that the second resonant frequency of the vibration sensing device 2100 may be adjusted and/or set according to the actual needs to improve the sensitivity of the vibration sensing device, and the volume of the housing 2151 may be reduced to improve the user experience.

In some embodiments, an adjusting element may be arranged in the first housing 2151 to adjust the size of the target cavity, thereby adjusting the structural parameters of the at least one vibration component. As an example, FIG. 22 is a cross-sectional view of an exemplary vibration sensing device according to some embodiments of the present disclosure. As shown in FIG. 22, the vibration sensing device 2200 may include a first housing 2251, an air conduction vibration sensor, a vibration component, and a target cavity 2220. The air conduction vibration sensor may include a second housing 2252, an acoustic-electric conversion element 2230, and an acoustic inlet hole 2270. The plate body 2210 and the liquid filled in the target cavity 2220 may form a vibration component of the vibration sensing device 2200. One or more elements in the vibration sensing device 2200 may be the same as or similar to one or more elements in the vibration sensing device 2100 shown in FIG. 21. For example, the first housing 2251, the second housing 2252, the acoustic-electric conversion element 2230, and the sound inlet hole 2270 in the vibration sensing device 2200 may be the same or similar to the first housing 2151, the second housing 2152, the acoustic-electric conversion element 2130, and the sound inlet hole 2170 in the vibration sensing device 2100.

The difference between the vibration sensing device 2200 shown in FIG. 22 and the vibration sensing device 2100 shown in FIG. 21 includes that the vibration sensing device 2200 may include an adjusting element 2240, and the adjusting element 2240 may be arranged in the first housing 2251 and at least a part of the first housing 2252 (e.g., the side wall 2253 of the second housing 2152). For example, the adjusting element 2240 may be separated from the second housing 2252 (e.g., the side wall 2253 of the second housing 2252) The first housing 2251 (e.g., the bottom walls 2251-3 of the first housing 2251) are physically connected. In some embodiments, the adjusting element 2240 may be arranged in the target cavity 2220 or be a part of the cavity wall of the target cavity 2220. For example, as shown in FIG. 22, both ends of the plate body 2220 may be respectively connected to the adjusting element 2240 and the side wall 2251-1 of the first housing 2251 The plate body 2210 and part of the first housing 2251 (e.g., the side walls 2251-1 and bottom walls 2251-3 of the first housing 2251) may define the target cavity 2220. The structural parameters of the at least one vibration component may be set and/or adjusted by setting and/or adjusting the adjusting element 2240, thereby adjusting the size of the second resonant frequency of the vibration sensing device 2200. For example, by changing the size and/or position of the adjusting element 2240, the size of the plate body 2210 and/or the mass of the liquid in the target cavity 2220 may be adjusted, thereby adjusting the second resonant frequency of the vibration sensing device 2200. In some embodiments, the position of the adjusting element 2240 may be adjusted during the production and component process of the vibration sensing device 2200 or after the completion of the component to adjust the structural parameters of the plate body 2210 and/or the target cavity 2220, so that the sensitivity of the vibration sensing device 2200 may be improved in different frequency ranges according to the actual situation to meet the personalized setting needs of different users.

The above description of the vibration sensing device 2100 and/or the vibration sensing device 2200 is for illustration purposes only and is not intended to limit the scope of the present disclosure. Those skilled in the art may make various changes and modifications based on the description of the present disclosure. For example, the target cavity 2120 of the vibration sensing device 2100 and/or the target cavity 2220 of the vibration sensing device 2200 may be provided with one or more sub-cavities filled with solids, liquids, and/or gases for improving the compressibility of the target cavity 2220 and for facilitating the adjustment and/or setting the adjustment of the second resonant frequency of the vibration sensing device 2200. For details about the sub-cavities, please refer to FIG. 6 and related descriptions. Such changes and modifications are still within the protection scope of the present disclosure.

The basic concepts have been described above. Obviously, to those skilled in the art, the disclosure of the invention is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure. Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it should be emphasized and noted that the "one embodiment," or "one embodiment," or "an alternative embodiment" mentioned twice or more in different positions in the application does not necessarily refer to the same embodiment. In addition, some features, structures, or features in the present disclosure of one or more embodiments may be appropriately combined. In addition, those skilled in the art may understand that various aspects of the present disclosure may be illustrated and described through several patentable categories or situations, including any new and useful processes, machines, products or combinations of materials or any new and useful improvements to them.

In addition, unless explicitly stated in the claims, the order of processing elements and sequences, the use of numbers and letters, or the use of other names in the disclosure are not used to define the order of the process and method of the disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the quantity of components and attributes are used. It should be understood that such numbers used in the description of the embodiments use modifiers such as "about", "approximately" or "substantially" in some examples. to modify. Unless otherwise stated, "about", "approximately" or "substantially" indicates that the figure allows for a variation of ±20%. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

We claim:

1. A vibration sensing device, comprising:
    a vibration sensor having a first resonant frequency; and
    at least one vibration component is configured to transmit received vibrations to the vibration sensor, the at least one vibration component comprising a liquid arranged in a target cavity and a plate body forming a part of a cavity wall of the target cavity, wherein
    the at least one vibration component provides at least one second resonant frequency for the vibration sensing device, and the at least one second resonant frequency is different from the first resonant frequency.

2. The vibration sensing device of claim 1, wherein the at least one vibration component is configured to form one or more resonant systems, and one of the one or more resonant systems is composed of the liquid and the plate body.

3. The vibration sensing device of claim 1, wherein the first resonant frequency is related to structural parameters of the vibration sensor, and the at least one second resonant frequency is related to structural parameters of the at least one vibration component.

4. The vibration sensing device of claim 1, wherein each of the at least one second resonant frequency is lower than the first resonant frequency.

5. The vibration sensing device of claim 1, wherein a difference between a peak and a trough of a frequency response curve of the vibration sensing device is in the range of 5 dBV to 15 dBV.

6. The vibration sensing device of claim 1, wherein the vibration sensing device further comprises an adjusting element, the adjusting element being arranged in the target cavity or being a part of the cavity wall of the target cavity, and the adjusting element being configured to define a size of the target cavity.

7. The vibration sensing device of claim 1, wherein the target cavity includes a first sub-cavity and a second sub-cavity, the first sub-cavity being configured to contain the liquid, and the second sub-cavity being configured to contain one or more fillers of gas, liquid or solid.

8. The vibration sensing device of claim 2, wherein the vibration sensor comprises a bone conduction vibration sensor, the bone conduction vibration sensor comprising a housing, an acoustic-electric conversion element, and a vibration transmission element,
the housing generates vibrations in response to an external vibration signal, and the vibration transmission element transmits the vibrations to the acoustic-electric conversion element,
the at least one vibration component is configured to receive vibrations of at least one of the housing and the vibration transmission elements and transmit the vibrations to the acoustic-electric conversion element, wherein the acoustic-electric conversion element has different frequency responses to the vibrations transmitted by the vibration transmission element and the vibrations transmitted by the at least one vibration component.

9. The vibration sensing device of claim 8, wherein the plate body includes a first plate body and a second plate body, the first plate body and the second plate body divide a space in the housing into a plurality of cavities, and the plurality of cavities include a first cavity defined by the first plate body, the second plate body, and the vibration transmission element, a second cavity defined by the first plate body and a part of the housing, and a third cavity defined by the second plate body and a part of the housing, and the target cavity includes one or more of the plurality of cavities.

10. The vibration sensing device of claim 9, wherein the target cavity comprises the first cavity.

11. The vibration sensing device of claim 10, wherein the acoustic-electric conversion element is disposed in the first cavity.

12. The vibration sensing device of claim 11, wherein the second cavity or/and the third cavity contain gas, and the at least one vibration component further includes the gas contained in the second cavity or/and the third cavity.

13. The vibration sensing device of claim 11, wherein the at least one vibration component further comprises a vibration pickup element arranged between the housing and the vibration transmission element, and the vibration pickup element is configured to vibrate in response to vibrations of the housing.

14. The vibration sensing device of claim 13, wherein,
the one or more resonant systems include a first resonant system and a second resonant system,
the first resonant system is composed of the liquid and the plate body, and
the second resonant system is composed of the vibration pickup element, the vibration transmission element, the acoustic-electric conversion element, the liquid and the plate body.

15. The vibration sensing device of claim 9, wherein the target cavity comprises at least one of the second cavity or the third cavity.

16. The vibration sensing device of claim 15, wherein the at least one vibration component further comprises a vibration pickup element arranged between the housing and the vibration transmission element.

17. The vibration sensing device of claim 16, wherein the first plate body and the second plate body comprise a rigid plate, and
the one or more resonant systems include a resonant system formed by the vibration transmission element, the acoustic-electric conversion element, the liquid, the plate, and the vibration pickup element.

18. The vibration sensing device of claim 1, wherein the vibration sensor comprises an air conduction vibration sensor, and the air conduction vibration sensor comprises an acoustic-electric conversion element and a sound inlet hole.

19. The vibration sensing device of claim 18, wherein the vibration sensing device further comprises a housing physically connected to the at least one vibration component, and the housing and a part of the vibration sensor form a receiving space for containing the at least one vibration component;
the housing is configured to generate vibrations in response to an external vibration signal; and
the at least one vibration component is acoustically connected to the acoustic-electric conversion element through the sound inlet hole, and the at least one vibration component is configured to receive the vibrations generated by the housing and transmitting the vibrations to the acoustic-electric conversion element through the sound inlet hole.

20. The vibration sensing device of claim 19, wherein at least part of the plate body is physically connected to the housing, and the target cavity includes a cavity defined by the plate body and at least part of the housing.

* * * * *